United States Patent [19]

Chemla et al.

[11] Patent Number: 4,528,464
[45] Date of Patent: Jul. 9, 1985

[54] DEGENERATE FOUR-WAVE MIXER USING MULTIPLE QUANTUM WELL STRUCTURES

[75] Inventors: Daniel S. Chemla, Rumson; David A. B. Miller, Lincroft; Peter W. Smith, Colts Neck, all of N.J.

[73] Assignee: AT&T Bell Laboratories, Murray Hill, N.J.

[21] Appl. No.: 470,319

[22] Filed: Feb. 28, 1983

[51] Int. Cl.³ .............................. G02F 2/00; H03F 7/00
[52] U.S. Cl. ............................ 307/425; 357/17; 372/50
[58] Field of Search ................ 307/425, 428, 427; 372/43, 44, 21, 50, 75; 357/16

[56] References Cited

U.S. PATENT DOCUMENTS

| | | | |
|---|---|---|---|
| 3,816,754 | 6/1974 | Hodgson et al. | 307/88 |
| 3,982,207 | 9/1976 | Dingle et al. | 331/94.5 |
| 4,091,290 | 5/1978 | Bjorklund et al. | 307/88 |
| 4,095,121 | 6/1978 | Begley et al. | 307/88 |
| 4,107,544 | 8/1978 | Kiddal et al. | 307/88 |
| 4,178,079 | 12/1979 | Bjorklund et al. | 350/353 |
| 4,198,162 | 4/1980 | Bjorklund et al. | 356/349 |
| 4,205,329 | 5/1980 | Dingle et al. | 357/16 |
| 4,220,928 | 9/1980 | Bloom et al. | 330/4 |
| 4,261,771 | 4/1981 | Dingle et al. | 148/175 |
| 4,352,566 | 10/1982 | Bjorklund et al. | 356/364 |

OTHER PUBLICATIONS

Journal of Applied Physics, vol. 53, No. 10, Oct. 1982, at p. R150–J. S. Blakemore.
Applied Physics Letters, vol. 41, Oct. 1982, pp. 679-681–Miller et al.
Applied Physics Letters, vol. 40, Sep. 1982, p. 476–Olego et al.

Primary Examiner—James W. Davie
Attorney, Agent, or Firm—Gregory C. Ranieri

[57] ABSTRACT

A four-wave mixer which uses a multiple quantum well structure as a nonlinear optical material is provided. There are provided means for providing a first beam of light which propagates through said multiple quantum well structure, and means for providing a second beam of light which also propagates through said multiple quantum well structure and substantially overlaps said first beam of light within said MQW structure. At least one ouput phase conjugate beam of light is produced by interaction of said first and said second beams of light with said multiple quantum well structure. An alternate embodiment has two counterpropagating pump beams and a probe beam of light which produce a backward scattered phase conjugate beam of light.

27 Claims, 36 Drawing Figures

DEGENERATE FOUR-WAVE MIXER USING MULTIPLE QUANTUM WELL STRUCTURES

BACKGROUND OF THE INVENTION

1. Field of the Invention

This invention relates to production of an electromagnetic wave by degenerate four-wave mixing using a multiple quantum well structure as a room temperature nonlinear optical element.

2. Description of the Prior Art

Heretofore at room temperature nonlinear optical materials have required more power than is available from a milliwatt range solid state laser in order to saturate their absorption and thereby cause their index of refraction to vary with incident light intensity.

Nonlinear effects of light intensity on the index of refraction may be represented by the equation $$n = n_L + n_2 I \tag{1}$$

where n is the index of refraction of the material, $n_L$ is the low intensity index of refraction, I is the intensity of the incident light beam in, for example, units of Watts/cm$^2$, and $n_2$ is the coefficient of nonlinearity of the material and may be expressed in the units cm$^2$/Watt.

The third order susceptibility $X^{(3)}$ gives a more general specification of the nonlinear properties of materials than does $n_2$. $n_2$ is related to the third order susceptibility.

Measurements of $n_2$ at a wavelength of 1.6 microns for a number of materials were reported by Moran et. al. in the article "Interferometric Measurements of the Nonlinear Refractive Index Coefficient Relative to CS$_2$ in Laser System Related Materials", in the *IEEE Journal of Quantum Electronics*, Vol. QE-11, June 1975, p. 259, and showed that $n_2$ for the material CS$_2$ is from 10 to 100 times larger than for a variety of materials used in laser construction. Moran et. al. give $n_2 = 3.10^{-14}$ cm$^2$/Watt for CS$_2$. A measurement of the third order nonlinear susceptibility $X^{(3)}$ of silicon at a wavelength of 1.06 microns was reported by Jain et. al. in the article "Degenerate Four-Wave Mixing Near the Bandgap of Semiconductors" in *Applied Physics Letters*, Vol. 35, September 1979, p. 454, as $8.10^{-8}$ esu, and this value is equivalent to a value of $n_2 = 3.5 \times 10^{-10}$ cm$^2$/Watt. The above values of $n_2$ are too small to make the above materials useful in a nonlinear optical device in which a milliwatt diode laser is used as the light source.

Heretofore degenerate four wave mixing (DFWM) has been used for a number of optical processing applications. DFWM was used for correction of phase aberrations in laser amplifier systems, Bloom et. al. U.S. Pat. No. 4,220,928 issued September 1980, using CS$_2$, or Nd:YAG as the nonlinear material. DFWM was used for a tunable optical filter, Bjorklund et. al. U.S. Pat. No. 4,198,162 issued April 1980, using atomic sodium vapor, ruby, or CS$_2$ as the nonlinear medium. DFWM was used for a high-speed spectrally selective optical gate, Bjorklund et. al. U.S. Pat. No. 4,178,079 issued Dec. 1979, using CS$_2$, retinol, retinol acetate, ruby, atomic metallic vapor, or Nd:YAG as the nonlinear material. DFWM was used for detection of birefringence in irregularly shaped objects, Bjorklund et. al. U.S. Pat. No. 4,352,566 issued October 1982, using atomic sodium vapor, Nd:YAG, ruby, BSO, or LiNbO$_3$ as the nonlinear medium.

Four-wave mixing was used for making a tunable laser, Hodgson et. al. U.S. Pat. No. 3,816,754 issued June 1974, using a variety of metallic vapors, including potassium, rubidium, cesium, sodium, or lithium as the nonlinear material. Four-wave mixing was tuned by use of stark processes, Bjorklund et. al. U.S. Pat. No. 4,091,290 issued May 1978, using strontium vapor as the nonlinear material. Four-wave mixing was used for tuning of lasers in the infrared region, Begley et. al. U.S. Pat. No. 4,095,121 issued June 1978, using NH$_3$, LH$_3$F, D$_2$, HCL, HF, CO, or H$_2$ as the nonlinear medium. Four-wave mixing using liquids because of their higher density was suggested by Kiddal et. al. U.S. Pat. No. 4,107,544 issued August 1978, using liquid N$_2$H$_2$, O$_2$, CO$_2$, CO, NO, or CH$_4$ as the nonlinear medium.

DFWM was used as a phase conjugate mirror by R. C. Lind et. al., as reported in the article "Demonstration of the Longitudinal Modes and Aberration Correction Properties of a Continuous-Wave Dye Laser with Phase Conjugate Mirror", *Optics Letters*, Vol. 6, pp. 554–556, Nov. 1981, in which sodium vapor was used as the nonlinear material.

Hegarty et. al. in the article "Resonant Degenerate Four-Wave Mixing in GaAs Multiquantum Well Structures," published in *Applied Physics Letters*, January 1982, at pp. 132–134, observed backward degenerate four-wave mixing with GaAs/AlGaAs multiple quantum well structures, but observed the effect only at temperatures below about 90° K. The low temperature operation shown by Hegarty et. al. is impractical for commercial device utilization.

A common problem exhibited by all of the above nonlinear optical materials is that their third order nonlinear susceptibility is too small for a practical device using a diode laser light source.

SUMMARY OF THE INVENTION

The foregoing problem, the design of a degenerate four-wave mixer used in conjunction with the low light intensities supplied by available diode lasers, has been solved in accordance with the present invention. The present invention teaches the use of a multiple quantum well (MQW) structure in conjunction with a milliwatt power level diode laser light source for the design of a degenerate four-wave mixer.

It is an aspect of the present invention to provide MQW structures for four-wave mixers which may be tuned to exciton absorption peaks which are at photon energies which are useful in, for example, optical fiber communication systems. Tuning may be accomplished, for example, by adjustment of alloy compositions in order to adjust the height of the bandgap of the MQW materials, and, for example, by adjustment of the thickness of the narrow bandgap material in the MQW in order to adjust the exciton binding energy.

It is a further aspect of the present invention to provide nonlinear optical devices which will operate with the low intensity available from diode lasers.

It is a still further aspect of the present invention to provide integrated optical devices in which signal processing MQW structures and also diode lasers may be grown on the same substrate.

It is a still further aspect of the present invention to provide both two input beam four-wave mixers and three input beam four-wave mixers.

DESCRIPTION OF THE PREFERRED EMBODIMENT

EXAMPLE 1

Figure 1:
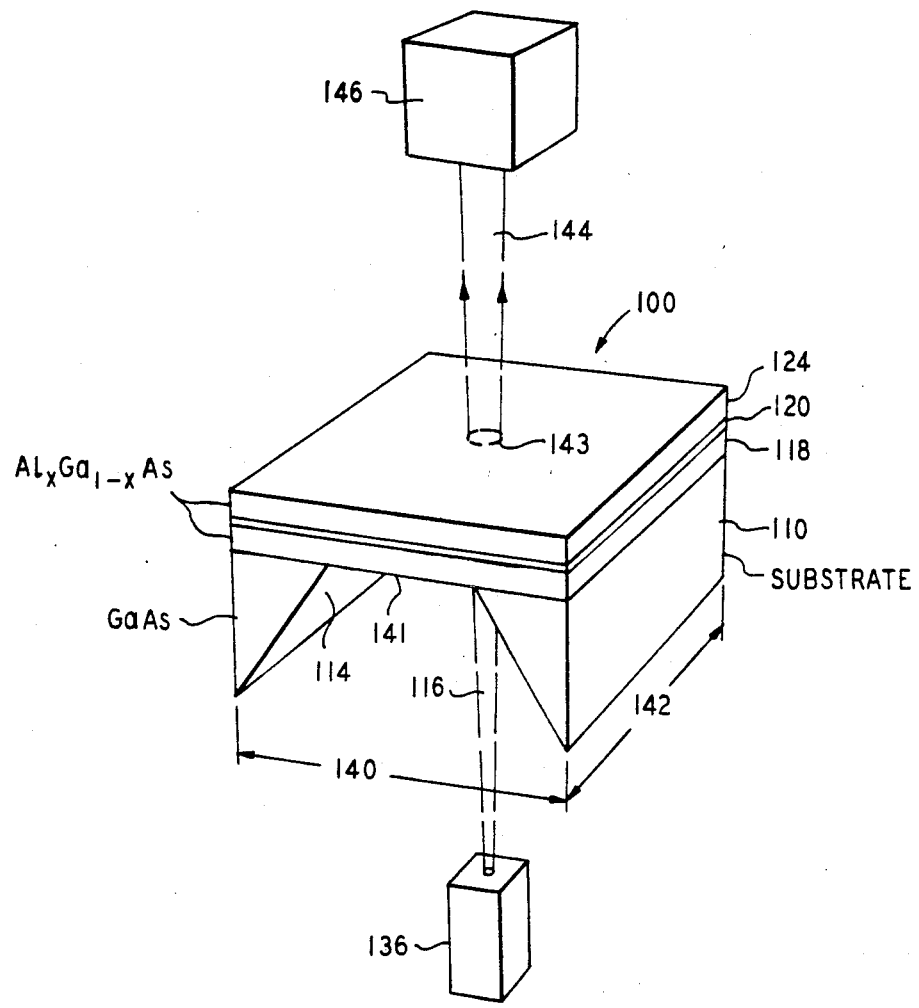
FIG. 1 is a perspective drawing showing a multiple quantum well structure mounted on a substrate.

Referring to FIG. 1, there is shown a GaAs-$Al_xG_{1-x}As$ MQW device 100. The MQW device is made of a substrate 110 upon which is mounted a MQW structure 120. The substrate 110 is made of GaAs. A lower cap layer 118 of $Al_xGa_{1-x}As$ is epitaxially grown upon the subdstrate 110. The MQW structure 120 is epitaxially grown to the upper surface of the layer of $Al_xGa_{1-x}As$ 118. An upper cap layer 124 of $Al_xGa_{1-x}As$ is epitaxially grown to overlay the MQW structure 120. A section 114 of substrate 110 is removed in order to expose lower cap layer 118 and provide access to MQW structure 120 by incident light beam 116. Alternately, substrate 110 may be removed entirely and MQW structure 120 mounted upon a transparent support, either with or without cap layers 118 and 124.

Figure 2:
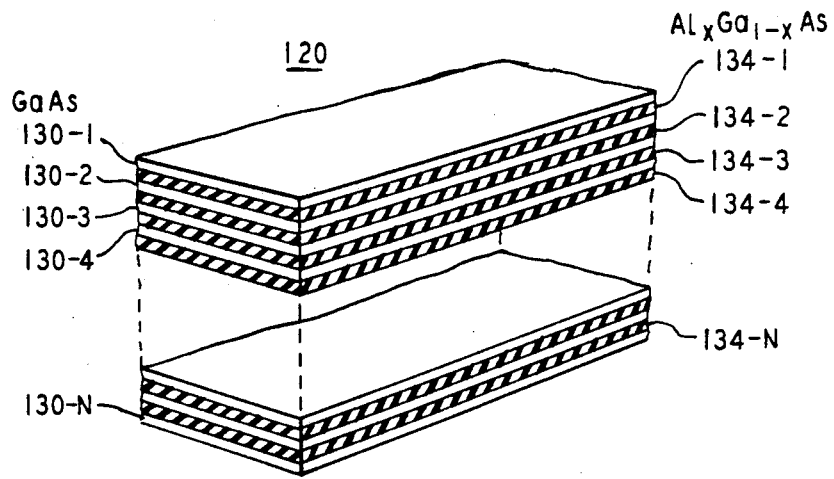
FIG. 2 is a perspective drawing showing details of a multiple quantum well structure of FIG. 1.

The MQW structure 120 is shown in FIG. 2 in an expanded view. Layers of GaAs 130-1 to 130-N are alternated with layers of $Al_xGa_{1-x}$ 134-1 to 134-N. Convenient choices for the dimensions of the structures in the MQW are, for the thicknesses of the GaAs 130-1 to 130-N layers 0.01 micron, for the thickness of the $Al_xGa_{1-x}As$ 134-1 to 134-N layers 0.01 micron, and for the thickness of the GaAs substrate 110 approximately 100 microns. The thickness of the $Al_xGa_{1-x}As$ layer 118 may conveniently be chosen as approximately 0.2 microns, and also the thickness of the $Al_xGa_{1-x}As$ layer 124 may be chosen as approximately 0.2 microns. The side dimensions of the substrate 110 may be chosen conveniently as dimension 140 approximately 1 to 5 millimeters and dimension 142 as approximately 1 to 5 millimeters. The MQW structure 120 then has layer planes of GaAs 130-1 to 130-N whose length and width are approximately 1 to 5 millimeters and whose thickness is approximately 0.01 microns. Also the alternate layers of $Al_xGa_{1-x}As$ 134-1 through 134-N have the same ratio of length and width to thickness, that is, 1 to 5 millimeters in length and width and approximately 0.01 microns in thickness. Thus, the MQW structure comprises essentially plane layers of GaAs 130-1 to 130-N interleaved with plane layers of $Al_xGa_{1-x}As$ 134-1 to 134-N. The alternate layers of GaAs 130-1 to 130-N and $Al_xGa_{1-x}As$ 134-1 to 134-N may be deposited using, for example, molecular beam epitaxy using methods as, for example, taught by Dingle et. al. in U.S. Pat. Nos. 3,982,207, 4,205,329 and 4,261,771. Epitaxial growth of heterostructures is further described in the reference book by Casey and Panish, "Heterostructure Lasers Part B: Materials and Operating Characteristics", at Chap. 6, pp. 71-155, and molecular beam epitaxy is particularly discussed at pp. 132-144, Academic Press, New York, 1978.

A light beam 116 is focused upon a first surface 141 of layer 118. The beam is focused to approximately a spot 143, shown on the upper side of the layer 124 as spot 143. The light beam is produced by light source 136. Light source 136 may conveniently be chosen as, for example, a laser whose wavelength is tunable. Light emerges from the MQW structure as exit beam 144. Exit beam 144 strikes detector 146. Detector 146 measures the intensity of light beam 144 which exited from the MQW device 100. The position of light source 136 and detector 146 may be interchanged. The frequency of the photons emitted by light source 136 may be varied. By measuring the intensity of the transmitted light using detector 146, it is possible to measure the optical transmission of the MQW device 100, the primary contribution to which is the optical transmission of MQW structure 120.

Figure 3:
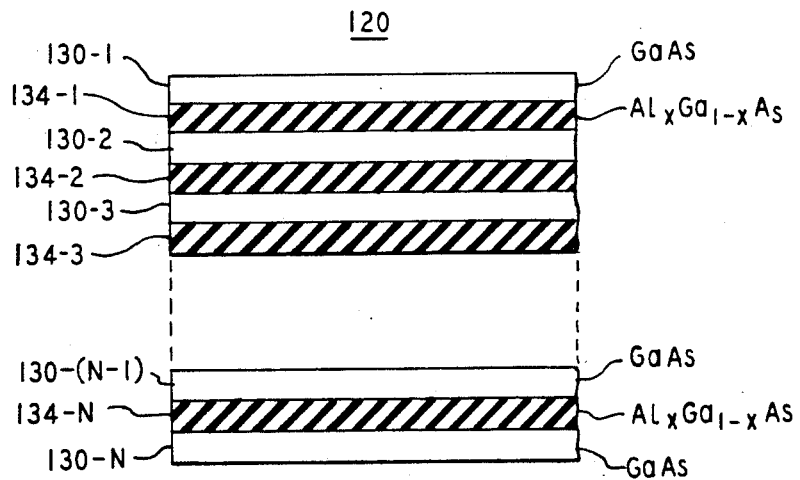
FIG. 3 is an end view of a multiple quantum well structure of FIG. 2.

Referring to FIG. 3, an end view of the MQW structure 120 of FIG. 2 is shown. The $Al_xGa_{1-x}As$ layers 134-1 to 134-N are shown interleaved with alternate layers of GaAs 130-1 to 130-N.

Figure 4:
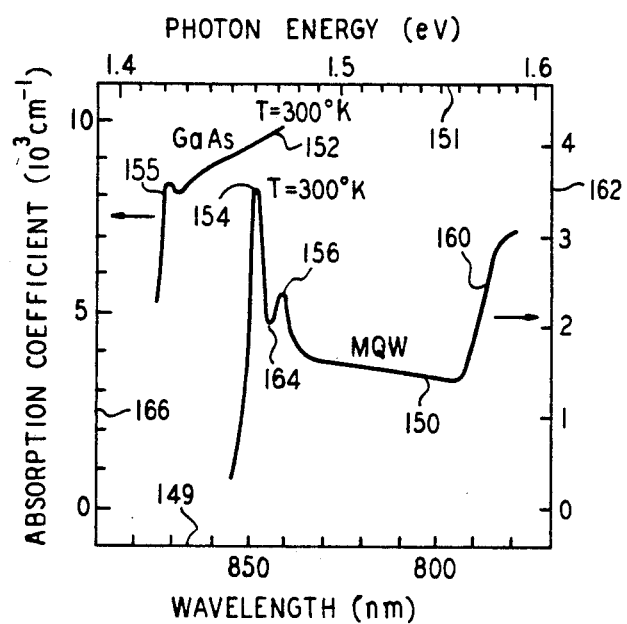
FIG. 4 is a graph of the optical transmission of a multiple quantum well structure and also bulk GaAs.

Referring to FIG. 4, a typical graph of the optical transmission of MQW device 100 is shown plotted versus both the photon wavelength along the bottom scale 149 and the photon energy along the top scale 151. The MQW absorption curve 150 shows peaks 154 and 156 indicating resonant absorption at a wavelength of approximately 848 nanometers and at approximately 842 nanometers. The data shown in curve 150 was taken using experimental apparatus at a temperature of 300° Kelvin. In comparison, optical absorption curve 152 for bulk GaAs is shown also taken at 300° Kelvin. Referring to the optical absorption of the MQW curve 150, the absorption peak 154 at 848 nanometers and the absorption peak 156 at approximately 842 nanometers are thought to arise from exciton structures within the MQW. Band-to-band transitions are thought to account for the stepwise rise 160 in the optical absorption curve 150. The scale 162 on the righthand side of FIG. 4 gives the optical absorption coefficient for the MQW structure curve 150. The curve shows an optical absorption approaching zero at wavelengths longer than 850 nanometers, with a sharp rise to an absorption peak 154 of approximately $3.5 \times 10^3 cm^{-1}$, and a rapid fall in optical absorption at approximately 845 nanometers to a minimum 164 and a small rise in absorption at 842 nanometers at peak 156. The optical absorption then remains approximately constant as the energy of the photons in the light beam increases until the next absorption rise 160. The difference between the optical absorption of the bulk GaAs and the MQW structure 120 is thought to arise from trapping of charge carriers within the GaAs layers of the MQW. The bulk GaAs exciton absorption depends upon exciton levels whose energy is too close to the bandgap to resolve the individual peaks. The excitons of the MQW structure 120 are thought to have greater binding energy because of interactions arising from the thinness of the GaAs layers.

Figure 5:
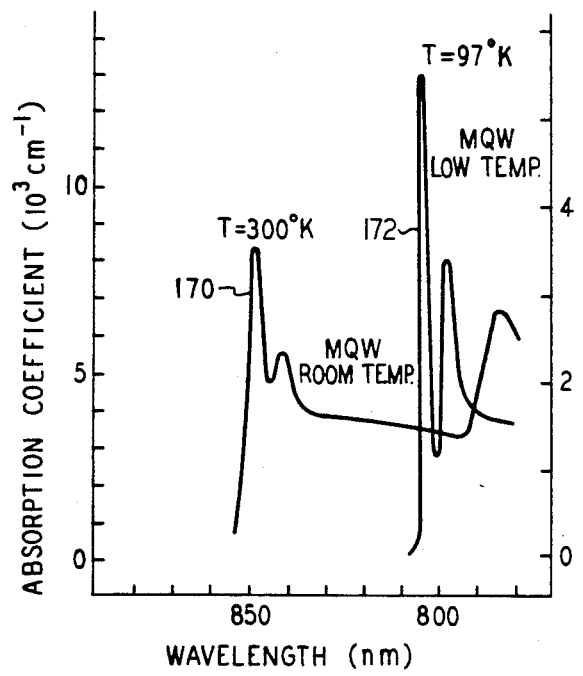
FIG. 5 is a graph of the optical transmission of a multiple quantum well structure at different temperatures.
Figure 7:
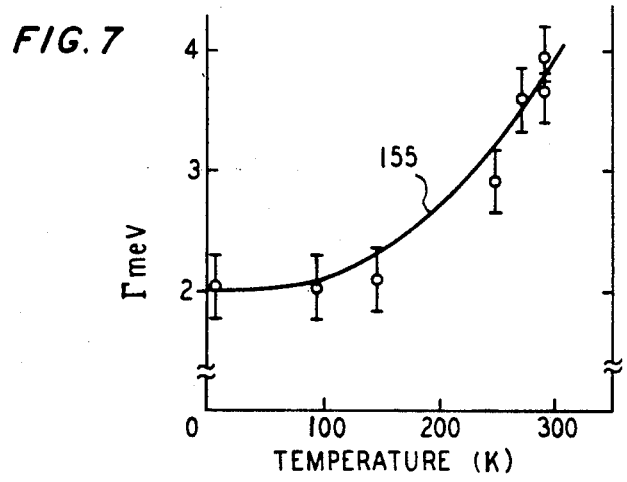
FIG. 7 shows the halfwidth at half maximum for the low energy exciton resonant peak plotted versus temperature.

Referring to FIG. 5, curve 170 gives the optical absorption of the MQW device 100 at a temperature of 300° Kelvin. Further, curve 172 gives the optical absorption of a similar device 100 at a temperature of approximately 97° Kelvin. The energy of the exciton absorption peak in curve 170 is seen to differ from the low temperature absorption peak in curve 172 in that the absorption peak 172 is shifted to shorter wavelengths, and the background absorption is reduced showing both excitonic peaks in curve 172 as being sharper and more pronounced than at 300° Kelvin. Referring to FIG. 7, the halfwidth of the lower energy exciton peak 154 in FIG. 4 is shown at half maximum of the peak, and is shown in curve 155 plotted versus the temperature at which the data was taken. Curve 155 in FIG. 7 shows that the exciton absorption is sharper at temperatures below room temperature of approximately 300° K., but that the resonance is not too broad to be lost in the interband transitions at temperatures of 300° K.

Figure 6:
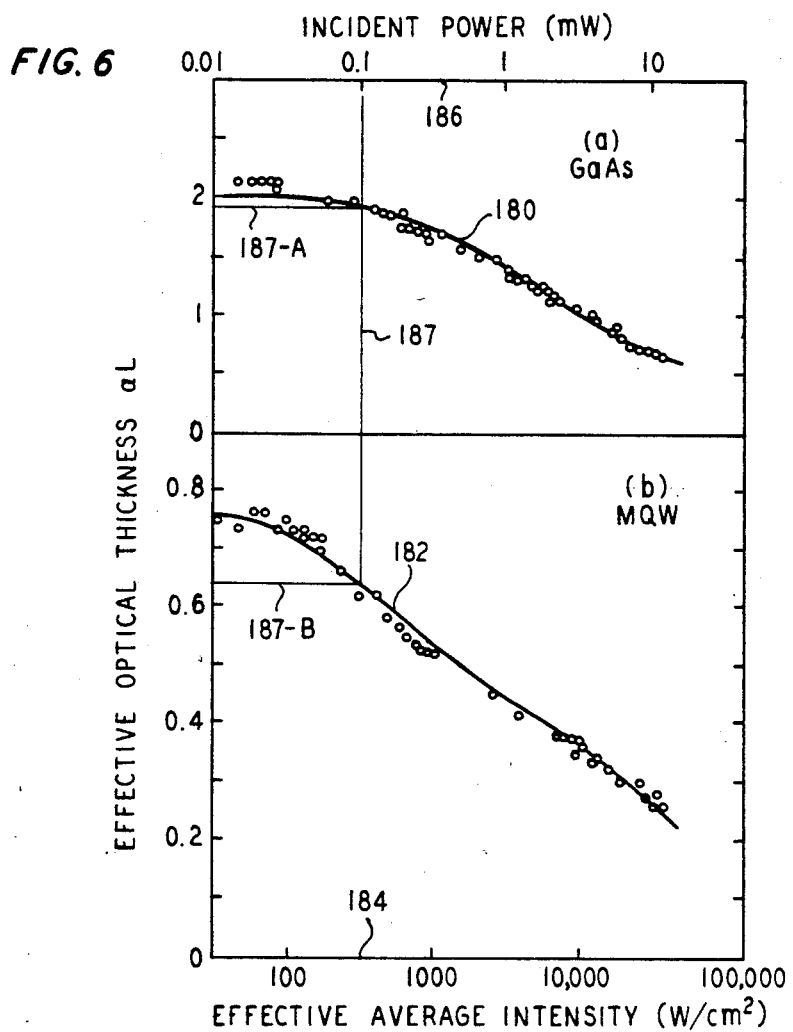
FIG. 6 is a graph showing optical absorption versus the intensity of an incident light beam for both a multiple quantum well structure and bulk GaAs.

Referring to FIG. 6, the effective optical thickness of the MQW structure mounted on substrate 100 is shown plotted versus the intensity of incident light beam 116. The incident light beam 116 is adjusted to coincide with peak 154 in the optical absorption curve 150 in the MQW structure 120 mounted on a substrate 110. The intensity of light beam 116 was varied by varying source 136. The effective optical thickness of the sample measures the total attenuation of the light beam as it traverses the sample. Curve 180 shows the effective optical thickness of a bulk sample of GaAs. Curve 182 shows the effective optical thickness of the MQW device 100. The effective average intensity of light beam 116 is plotted along the lower margin 184 of FIG. 6 and is shown to vary from 0 to approximately 50,000 Watts/$cm^2$. The total incident power in beam 116 is plotted along the upper margin 186 of FIG. 6 and is shown to vary from 0.01 to approximately 50 milliwatts. A comparison of the effective optical thickness of bulk GaAs and MQW device 100 at an incident light power of 0.1 milliwatts is shown by lines 187, 187-A, 187-B. The effective optical thickness of the bulk GaAs shown in curve 180 is shown to decrease from a value of approximately 2 to a value of approximately 1.9 at an incident power of approximately 0.1 milliwatts, an approximate change in effective optical thickness of $(2.0-1.9)/2=5\%$. In contrast, the effective optical thickness of the MQW device 100 is seen to vary from approximately 0.75 to approximately 0.63 as the incident power varies from zero to 0.1 milliwatts, for a percentage change of approximately $(0.75-0.63)/0.75=16\%$. The decrease in effective optical thickness with increasing beam intensity is attributed to saturation of the optical absorption of the material, and is commonly referred to as a nonlinear absorption. The large saturation exhibited by the MQW structure 120 at low light intensity makes it feasible to design nonlinear optical devices using diode lasers as the light source.

Figure 8:
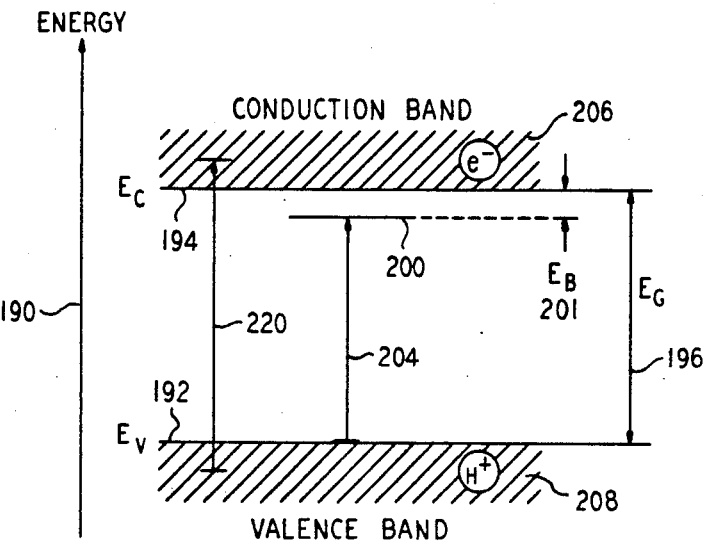
FIG. 8 shows the band structure of GaAs near the zero momentum point, and including an exciton level.

Referring to FIG. 8, the band structure of GaAs is shown in a simplified diagram. Reference to the GaAs band structure as shown in FIG. 8 provides insight into exciton absorption in MQW structure 120. Energy is plotted along the vertical axis 190. The valence band $E_v$ 192 and the conduction band $E_c$ 194 are shown along with the energy gap $E_G$ 196. An exciton level 200 is shown with a binding energy $E_B$ 201 measured from the conduction band 194.

A photon absorption transition 204 from the valence band 192 to the exciton level 200 is shown. Transition 204 represents an exciton creation transition, and such transitions are thought to be the cause of resonant absorption peaks 154 and 156 as shown in FIG. 4. After the exciton level 200 is formed as a result of photon absorption, the exciton may break apart and form both a conduction band electron 206 and a valence band hole 208. The exciton is thought to break apart as a result of ionization by a lattice vibration phonon which supplies the necessary energy.

An interband photon absorption transition 220 in which a conduction band electron 206 and a valence band hole 208 are formed as a result of photon absorption is shown. Interband photon transitions 220 are thought to account for the stepwise rise in optical absorption of MQW structure 120 as shown in FIG. 4. The interband photon absorption transition 220 is a direct transition because of the band structure of GaAs.

Figure 9:
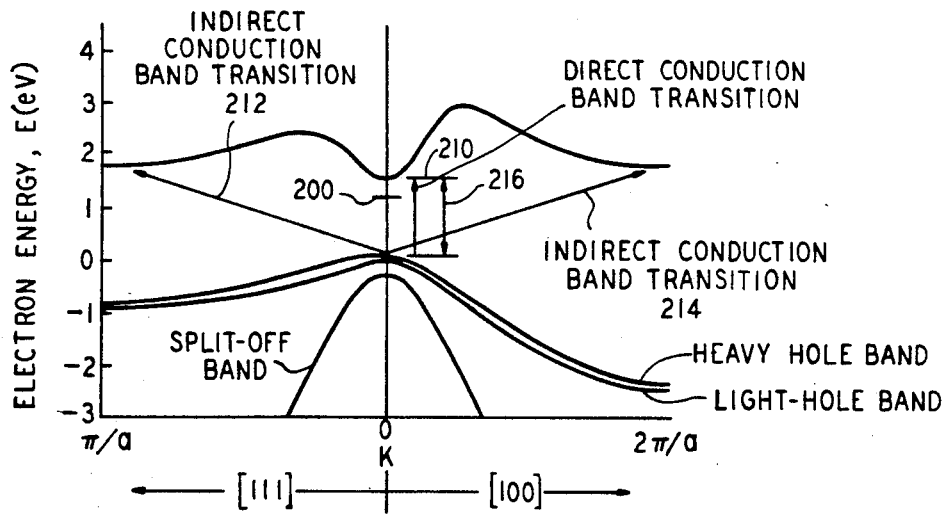
FIG. 9 shows the band structure of GaAs plotted as a function of momentum wave vector.

Referring to FIG. 9, the band structure of GaAs is shown with the energy plotted as a function of momentum wave vector along the [100] and [111] directions in momentum space. FIG. 9 is adapted from Casey and Panish in the book "Heterostructure Lasers, Pat A: Fundamental Principles", at p. 189, Academic Press, New York, 1978. A direct optical absorption transition 210 is shown near the zero momentum point. Further, indirect optical absorption transitions 212 and 214 are shown. Both direct optical absorption processes in GaAs and $Al_xGa_{1-x}As$ and indirect absorption processes in AlGaAs are useful in the present invention. Both GaAs and $Al_xGa_{1-x}As$ may be used as a charge carrier material in different embodiments of the present invention, and a direct bandgap in the charge carrier material is useful in the practice of the present invention. The width of the direct bandgap 216 is shown, and bandgap 216 corresponds to bandgap 196 shown in the simplified diagram in FIG. 8. Exciton level 200 is shown below the conduction band and at the zero momentum point as shown in FIG. 8. Indirect absorption processes are useful in the wide bandgap charge barrier material to produce electrons and holes which move into the narrow bandgap charge carrier material, where the electrons and holes contribute to saturation of exciton absorption.

Figure 10:
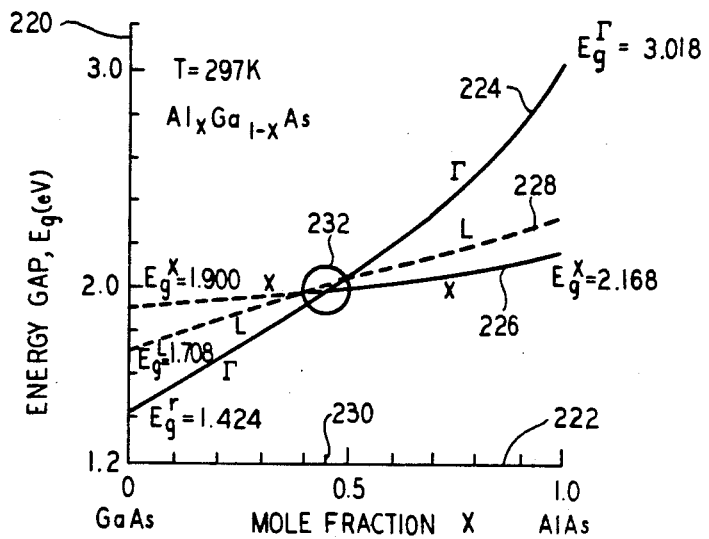
FIG. 10 is a graph of the width of the bandgap of $Al_xGa_{1-x}As$ as a function of mole fraction x.

Referring to FIG. 10, the width of the bandgap in the material $Al_xGa_{1-x}As$ is shown plotted as a function of the mole fraction x. The energy of the bandgap is plotted along the vertical axis 220. The mole fraction x is plotted along the horizontal axis 222. Curve 224 shows the direct bandgap at the zero momentum point. Curve 226 and curve 228 show two different indirect bandgaps. The lower bandgap becomes indirect at a mole fraction 230 of approximately x=0.42, where the zero momentum curve 224 crosses curve 226 at point 232. FIG. 10 is adapted from Casey and Panish in the book "Heterostructure Lasers Part A: Fundamental Principles", at p. 193, Academic Press, New York, 1978.

Figure 11:
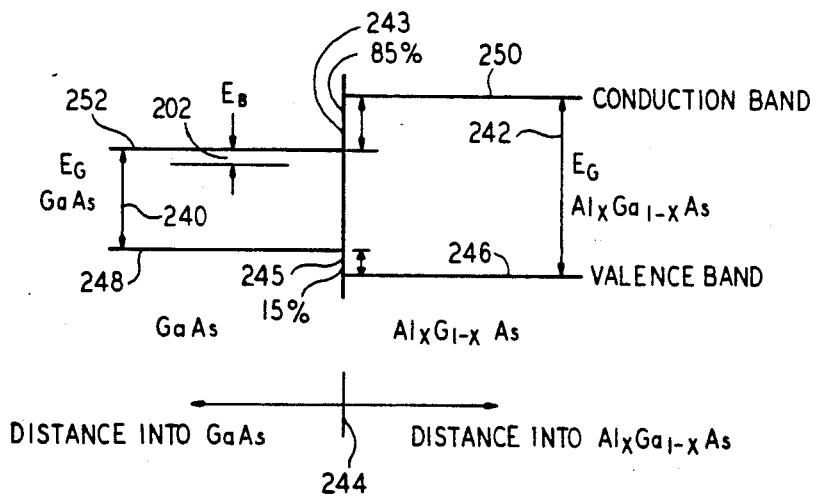
FIG. 11 shows in real space the band structure of GaAs compared with the band structure of $Al_xGa_{1-x}As$.

Referring to FIG. 11, the bandgap 240 of GaAs and the bandgap 242 of $Al_xGa_{1-x}As$ are shown for an epitaxially grown junction 244. Such junctions occur between the layers of epitaxially grown alternate layers of GaAs and $Al_xGa_{1-x}As$ as shown in FIGS. 2 and 3. The valence band edge 246 of $Al_xGa_{1-x}As$ is believed to be lower in energy than the valence band edge 248 of GaAs. The conduction band edge 250 of $Al_xGa_{1-x}As$ is believed to be higher in energy than the conduction band edge 252 of GaAs. The total difference between the two gaps, of GaAs and $Al_xGa_{1-x}As$, is believed to be distributed as approximately 15 percent 245 of the difference appears at a lowered valence band edge 246 of $Al_xGa_{1-x}As$, and approximately 85 percent 243 of the difference appears as an increase in the conduction band edge 250 of $Al_xGa_{1-x}As$.

Figure 12:
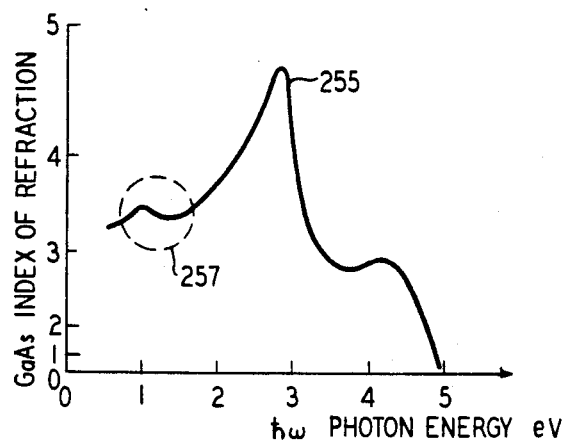
FIG. 12 shows the variation of the index of refraction with photon energy.

Referring to FIG. 12, the low intensity index of refraction of GaAs is shown schematically. FIG. 12 illustrates the index of refraction of GaAs for photon energy up to 5 eV. FIG. 12 is adapted from a plot of dielectric constant given by the reference "Semiconducting and Other Major Properties of Gallium Arsenide," J. S. Blakemore, published in the *Journal of Applied Physics*, Vol. 53, No. 10, October 1982 at pages R123, R150. The exciton range of the spectrum is indicated by circuit 257.

Figure 13:
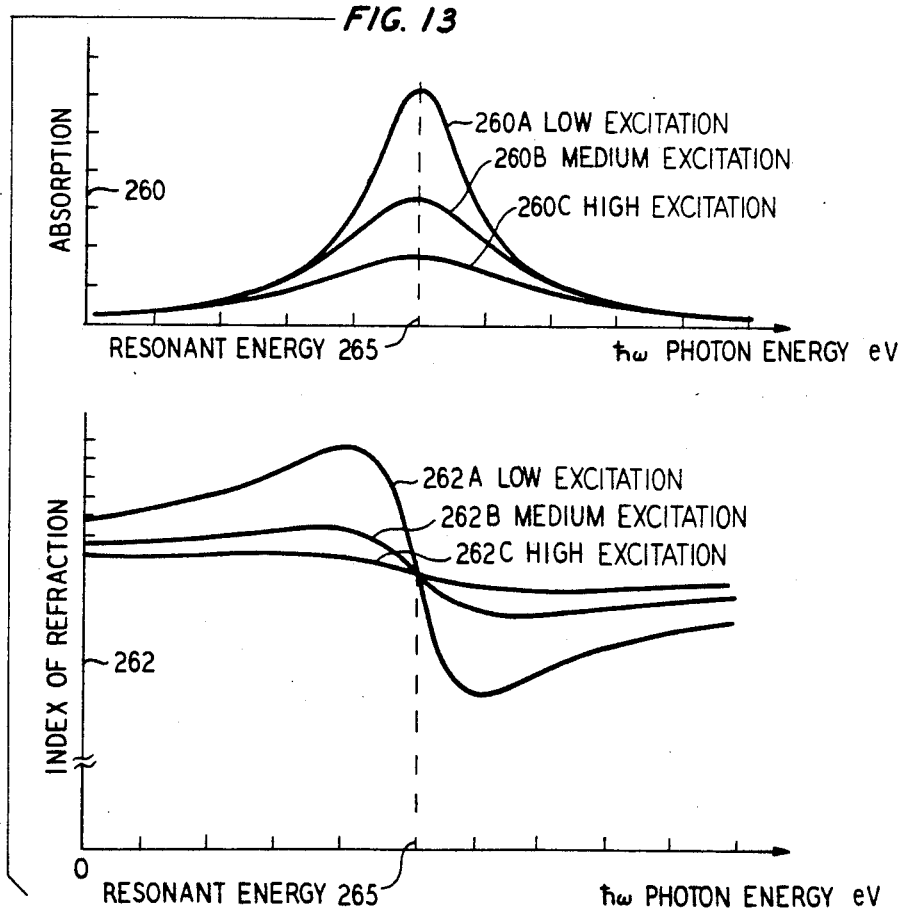
FIG. 13 shows the relation between optical absorption and index of refraction given by the Kramers-Kronig relationship.

Referring to FIG. 13, an example of the variation of optical absorption 260 and index of refraction 262 with photon energy is shown as the two are related by the Kramers-Kronig relationship using a Lorentzian absorption lineshape. The curves of optical absorptiion 260 and index of refraction 262 illustrate generally the variation of these quantities for exciton absorption over the photon energy range shown by circuit 257. The curves shown in FIG. 13 illustrate the relationship between optical absorption as shown in FIGS. 4 and 5 for MQW structure 120 and the corresponding index of refraction, as that relationship is given by the Kramers-Kronig relationship using a Lorentzian absorption lineshape.

Curve 260-A represents a large optical resonant absorption for a low incident light intensity, and a corresponding index of refraction is shown in curve 262-A. A smaller resonant absorption is represented by curve 260-B for a higher incident light intensity and the correspondingly smaller index of refraction is represented by curve 262-B. A further smaller resonant absorption is represented by curve 260-C for a still higher incident light intensity and the correspondingly smaller index of refraction is represented by cruve 262-C.

The variation of the index of refraction of GaAs with incident light intensity is complicated. For a single exciton resonance the Kramers-Kronig model illustrated in FIG. 13 shows that for photon energy below the resonant energy 265 the index of refraction decreases with increasing light intensity, while for photon energies above the resonant energy 265 the index of refraction increases with increasing incident light intensity.

For a multiple quantum well, the variation of index of refraction with light intensity depends upon the interaction of at least one and possibly several exciton resonance with the processes leading to the background index of refraction. These interactions involve quantum interference effects which further complicate the detailed variation of the index of refraction with both light intensity and photon energy. For example, the GaAs- $Al_xGa_{1-x}As$ MQW, whose measured optical absorption coefficient is shown in FIGS. 4 and 5, is dominated by two resolvable exciton absorption peaks superimposed upon an interband transition background. The decomposition of the GaAs-$Al_xGa_{1-x}As$ MQW absorption spectrum into two exciton resonances and an interband continuum is further illustrated in FIG. 22, as is discussed further below.

Figure 14:
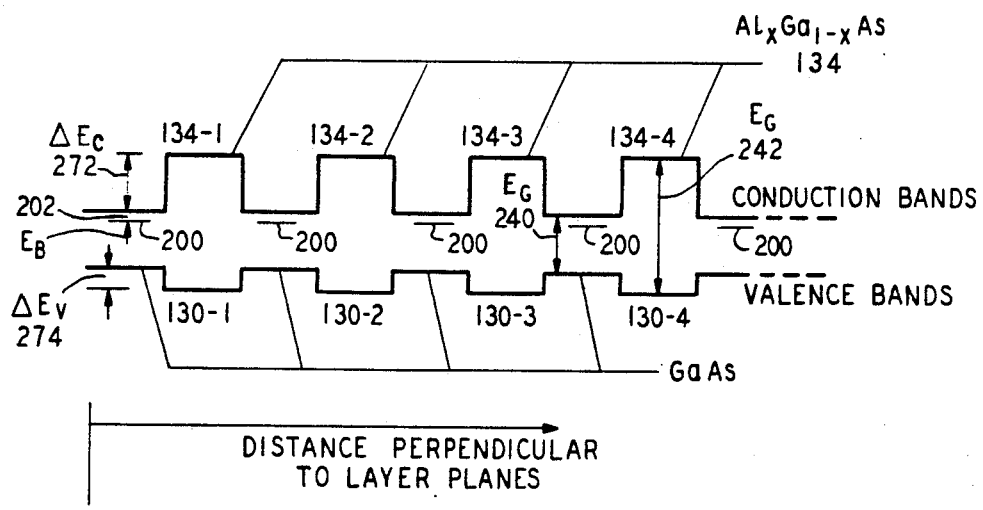
FIG. 14 shows in real space the band structure of a multiple quantum well made from GaAs and $Al_xGa_{1-x}As$.

Referring to FIG. 14, the potentials seen by both a conduction band electron and by a valence band hole within a MQW structure 120 are shown. Exciton levels 200 and binding energy $E_B$ 202 are shown. The conduction band electron energy barrier $\Delta E_C$ 272 is shown. The valence band hole energy barrier $\Delta E_V$ 274 is shown. A conduction electron produced in a GaAs layer 130 is trapped in a potential well with sides of height $\Delta E_C$ 272. The magnitude of $\Delta E_C$ 272 depends upon the mole fraction x of Al in the alternate $Al_xGa_{1-x}As$ layers 134. Correspondingly, valence band holes produced within a GaAs layer 130 are trapped by the energy barrier $\Delta E_V$ 274 between a GaAs layer 130 and a $Al_xGa_{1-x}As$ layer 134. Also the magnitude of the energy barrier $\Delta E_V$ 274 depends upon the mole fraction x of Al present within the $Al_xGa_{1-x}As$ layers 134. it is believed that the fraction $$\frac{\Delta E_C}{\Delta E_C + \Delta E_V} \simeq 0.85$$

and the fraction $$\frac{\Delta E_V}{\Delta E_C + \Delta E_V} \simeq 0.15$$

in an epitaxial junction between GaAs and $Al_xGa_{1-x}As$.

Figure 15:
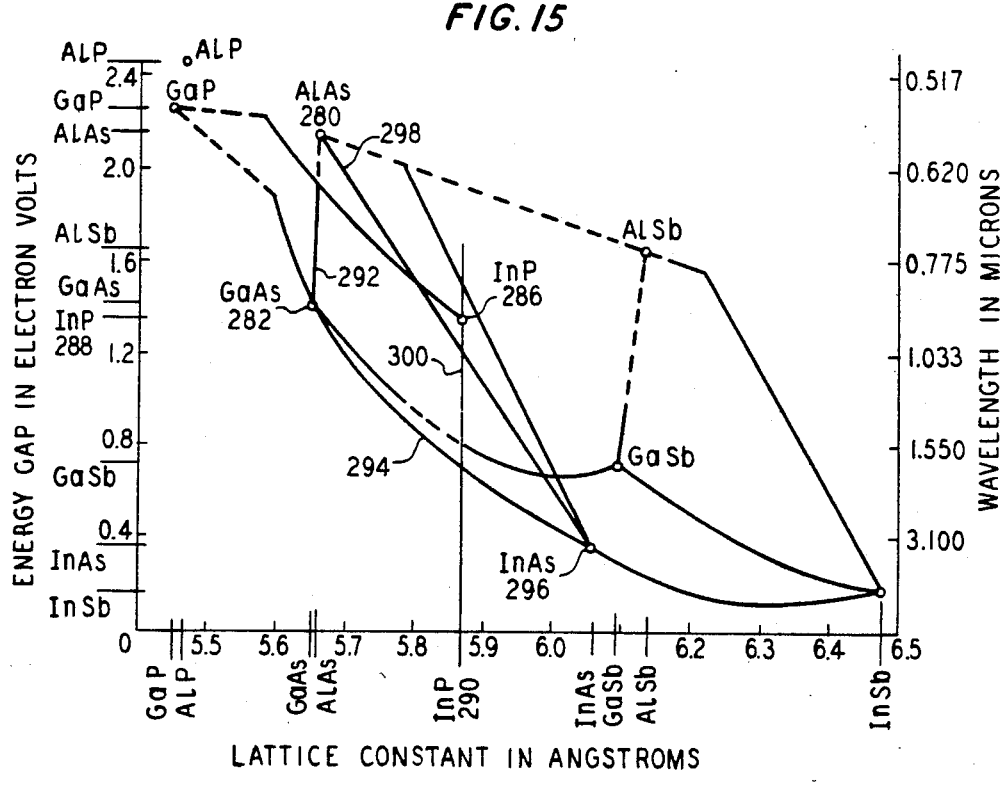
FIG. 15 is a graph showing lattice constant versus bandgap for a variety of alloy compositions.

Referring to FIG. 15, the curves depict the variation of both energy gap and lattice constant with variation of alloy composition for a number of useful binary and quaternary alloys. AlAs 280 is shown with a lattice constant of approximately 5.66 Angstroms and a bandgap of approximately 2.17 $E_V$. GaAs 282 is shown with a lattice constant of approximately 5.655 Angstroms and a bandgap of 1.42 $E_V$. The close match of the lattice constants of GaAs and AlAs permits epitaxial growth of the substances over a wide range of the mole fraction x of Al in $Al_xGa_{1-x}As$. Thus, layers of useful alloys of $Al_xGa_{1-x}As$ may be grown epitaxially upon layers of GaAs, and the bandgap of the alloy varied over the approximate range of 1.42 eV for pure GaAs to 1.95 for $Al_xGa_{1-x}As$ with x=0.42.

EXAMPLE 2

A MQW structure 120 may be made by using alternate layers of $Al_xGa_{1-x}As$ with different values of mole fraction x for the alternate layers, but x unequal to zero for the charge carrier layers. Values of mole fraction x should be smaller for the charge carrier layers and larger for the charge barrier layers in order that energy barriers at the layer junctions will trap the charge carriers within potential walls at the boundaries of the charge carrier and barrier layers. However, the most useful values of mole fraction x for charge carrier material lie within the range 0 through approximately 0.42 because for larger values of x, the valence to conduction band transitions become indirect, as referred to at FIG. 10. A GaAs crystal may be used as the substrate upon which alternate layers of $Al_xGa_{1-x}As$ are grown epitaxially because of the good lattice match.

EXAMPLE 3

The use of $In_{1-x-y}Ga_xAl_yAs$ as a material for MQW construction may be understood by reference to FIG. 15. InP is illustrated at point 286 as having a bandgap of approximately 1.35 eV 288 and a lattice constant of approximately 5.870 Angstroms 290. An alloy of a quaternary solution made from InAs and GaAs and AlAs may be represented by a point within the three-sided figure with boundary 292 drawn from AlAs 280 to GaAs 282, and boundary 294 drawn between GaAs 282 and InAs 296, and boundary 298 drawn from InAs 296 to AlAs 280. Those alloys which are lattice matched to InP are represented along the vertical line 300 passing through the InP point 286. It has been found that lattice matching occurs for compositions in which mole fraction x and mole fraction y are related by $$x+y=0.47\pm0.01 \tag{2}$$

Figure 16:
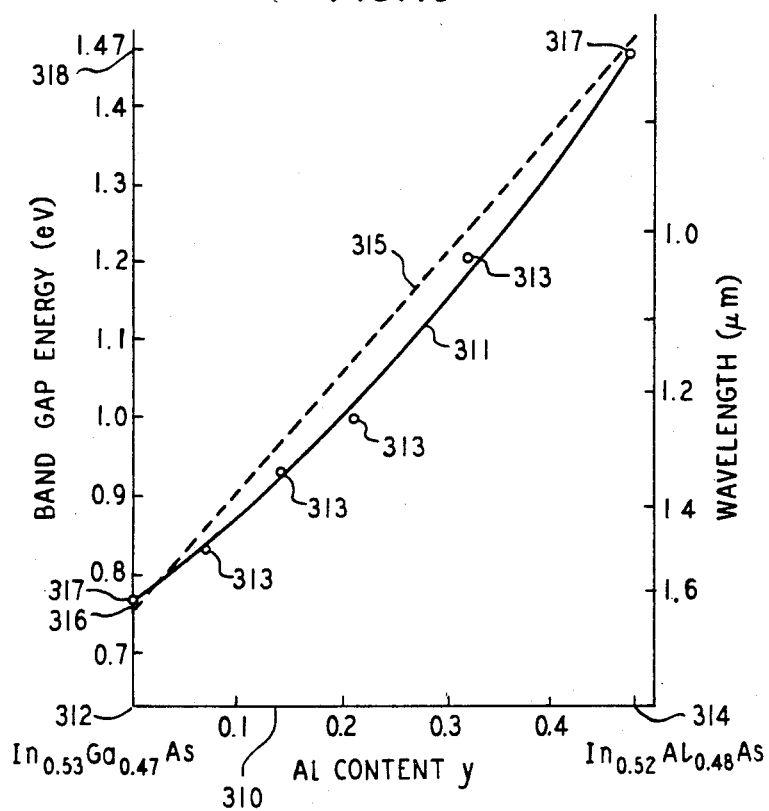
FIG. 16 is a graph of the bandgap energy of $In_{1-x-y}Ga_xAl_yAs$ versus Al content y.

The bandgap is expected to be adjustable between those of $In_{0.53}Ga_{0.47}As$ with a bandgap of 0.76 eV, 1.63 micron, and of $In_{0.52}Al_{0.48}As$ with a bandgap of 1.46eV, 0.85 micron. This spectral range is useful for optical communication systems because it contains the region of lowest absorption loss and of lowest dispersion for optical fibers, as further shown in FIG. 17, which is explained hereafter. The variation of bandgap with Al content y of $In_{1-x-y}Ga_xAl_yAs$ is shown in FIG. 16. The horizontal axis 310 represents a plot of y, the mole fraction of Al, and the left side 312 starts at y=0, which represents $In_{0.53}Ga_{0.47}As$. The value of y is plotted through the value 0.48 which represents $In_{0.52}Al_{0.48}As$ 314. The bandgap of the material is seen to vary from a value at y=0 of approximately 0.76 eV at point 316 through a value of approximately 1.47 at point 318. The measurements 313 shown in FIG. 16 are more fully discussed in the paper by Olego et. al., "Compositional Dependence of Band Gap Energy and Conduction-Band Effective Mass of $In_{1-x-y}Ga_xAl_yAs$ Lattice Matched to InP", in *Applied Physics Letter*, Vol. 40, September 1982, p. 476. Solid curve 311 is a fit to data points 313. Dotted curve 315 is a straight line approximation drawn between the endpoints 317 of the mole fraction y range.

Figure 17:
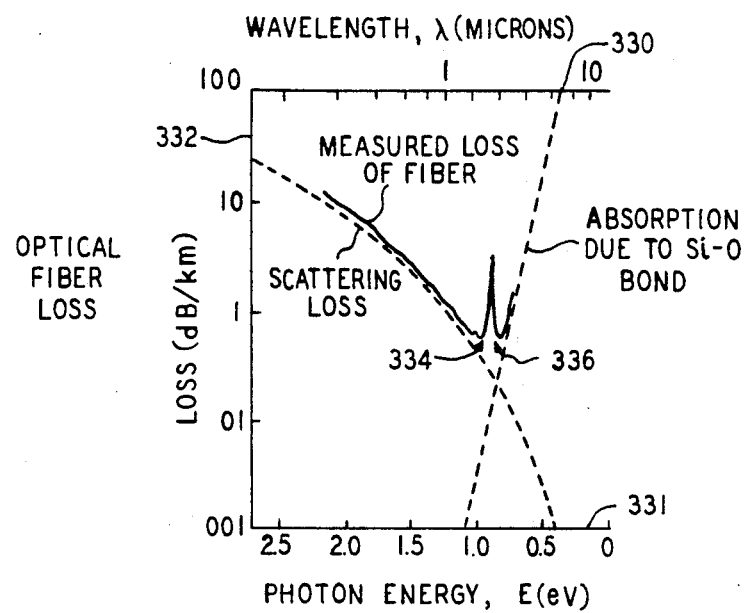
FIG. 17 is a graph of optical absorption versus photon energy for a typical optical fiber used in a lightwave communication system.
Figure 18:
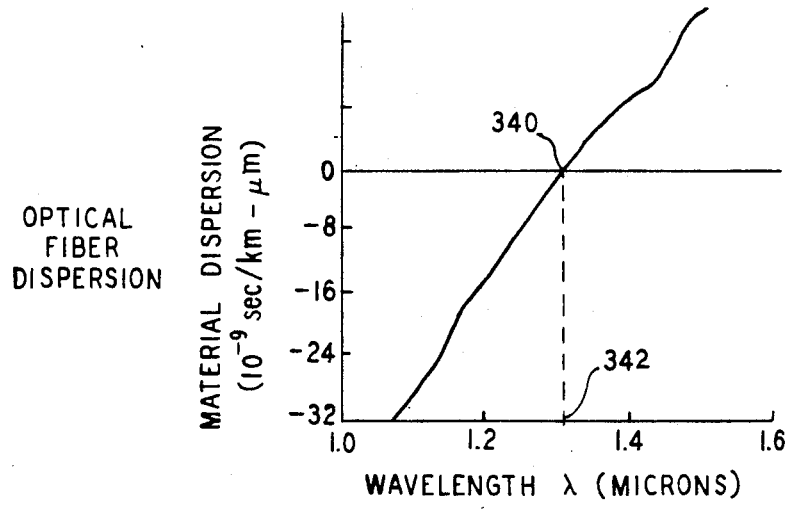
FIG. 18 is a graph of optical dispersion versus photon energy for a typical optical fiber used in a lightwave communication system.

Referring to FIGS. 17 and 18, the desirability of tuning the MQW structure 120 to wavelengths for which optical absorption is a minimum and optical dispersion is a minimum is explained. Referring to FIG. 17, there is illustrated the optical transmission loss of a typical $GeO_2$—$SiO_2$ core and $B_2O_3$—$SiO_2$ cladding optical fiber. The horizontal axis 330 gives a photon wavelength scale and axis 331 gives a photon energy scale. The vertical axis 332 gives the optical signal loss in decibels per kilometer of fiber. The absorption curve has a minimum 334 at approximately 1.2 micron and a second minimum 336 at approximately 1.6 micron. It is convenient to operate a lightwave communication system near a wavelength at which optical fiber has a minimum of loss due to optical absoprtion, such as at the first minimum 334 of 1.2 micron or the second minimum 336 of 1.6 micron.

Referring to FIG. 18, the material dispersion for the typical $GeO_2$—$SiO_2$ core and $B_2O_3$—$SiO_2$ cladding optical fiber is illustrated. The material dispersion is given in the units of $10^{-9}$ seconds per kilometer per micron. The material dispersion is proportional to the derivative of the index of refraction with respect to light wavelength. The dispersion is seen to pass through zero 340 at a wavelength of approximately 1.3 micron 342. It is convenient to operate an optical communications system at a wavelength at which the dispersion is near a minimum in order to prevent pulse spreading during transmission so that high data rates and short optical pulses may be utilized. FIGS. 17 and 18 are adapted from the reference book by Casey and Panish, "Heterostructure Lasers Part B: Materials and Operating Characteristics, at p. 2, Academic Press, New york, 1978.

Figure 19:
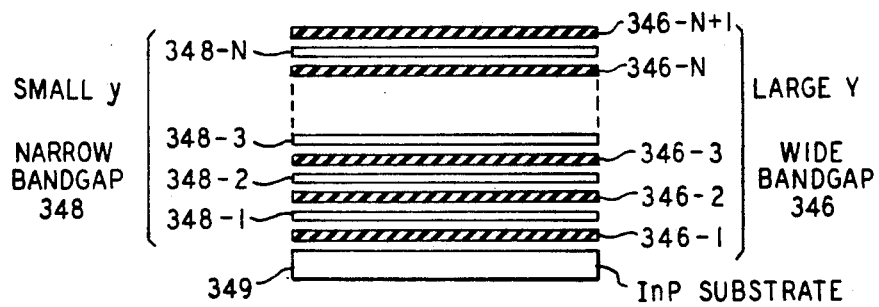
FIG. 19 is a diagram of a MQW structure using $In_{1-x-y}Ga_xAl_yAs$, with different bandgap compositions in alternate layers.

The use of $In_{1-x-y}Ga_xAl_yAs$ in MQW construction with $x+y=0.47\pm0.01$, with the charge carrier layers having one value of y and the charge barrier layers having a second value of y is illustrated in FIG. 19. Because the bandgap increases for increasing Al mole fraction y, the charge barrier layers 346-1 through 346-N+1 must have a larger Al content, and hence larger value of y than do the charge carrier layers 348-1 through 348-N. The larger bandgap layers form potential barriers which result in trapping of conduction band electrons and valence band holes within the smaller bandgap layers. A lattice of InP is shown as a substrate 349 upon which the layers of $In_{1-x-y}Ga_xAl_yAs$ are epitaxially grown.

EXAMPLE 4

The use of $Ga_xIn_{1-x}P_yAs_{1-y}$ as a material for MQW construction may be understood by reference to FIG. 15. Compounds of $Ga_xIn_{1-x}P_yAs_{1-y}$ may be lattice matched to a crystal of InP by use of compositions which fall along the vertical line 300. Compositions of $Ga_xIn_{1-x}P_yAs_{1-y}$ which are lattice matched to InP as a substrate can have bandgap values between approximately 1.25 eV or 0.99 micron through approximately 0.73 eV or 1.7 micron. This bandgap range covers the range of 1.2 micron to 1.6 micron for which optical fibers have minimum losses and minimum dispersion, and are therefore particularly useful for making signal processing devices using MQW structures.

Figure 20:
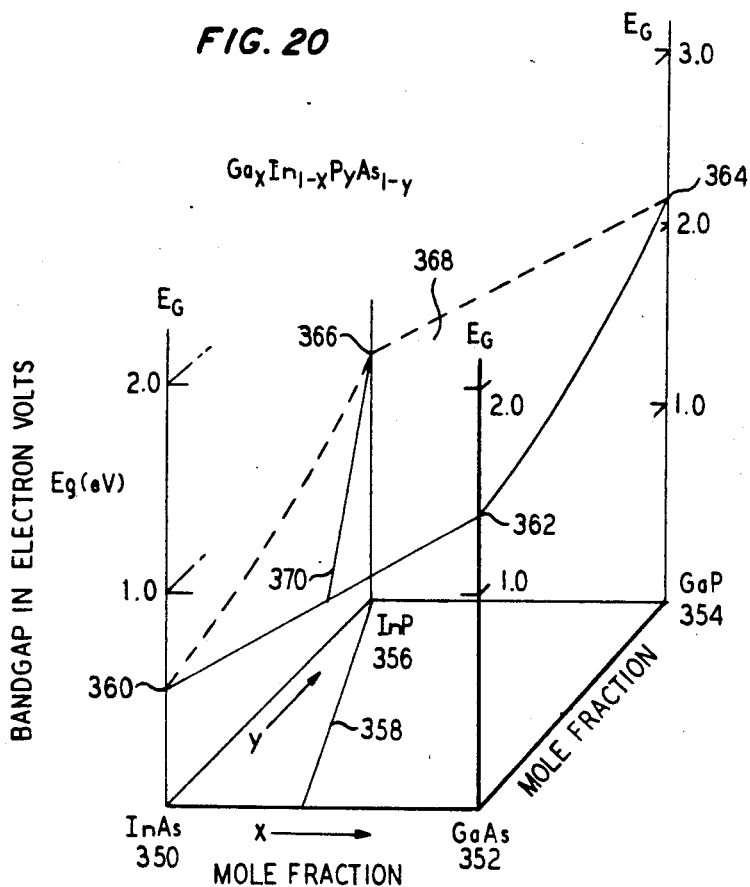
FIG. 20 is a three-dimensional representation of $Ga_xIn_{1-x}P_yAs_{1-y}$ bandgap energy plotted along the vertical axis versus mole fraction composition plotted in the horizontal plane.

Referring to FIG. 20, a three-dimensional representation of the compositional dependence of the energy gap for $Ga_xIn_{1-x}P_yAs_{1-y}$ is given. The vertices of a parallelogram represent InAs at the lower left corner 350, GaAs at the lower right corner 352, GaP at the right rear corner 354, and InP at the left rear corner 356. The compositional mole fractions which are lattice matched to InP are illustrated at line 358. The bandgap of the alloy is plotted along the vertical axis, with the bandgap of InAs at 0.420 eV 360, the bandgap of GaAs at 1.52 eV 362, the bandgap of GaP at 2.34 eV 364, and the bandgap of InP at 1.42 eV 366. The projection of the lattice match line 358 on the bandgap surface gives an intersection line 370 which gives the variation in bandgap for compositions of $GaIn_{1-x}P_yAs_{1-y}$ which are lattice matched to InP. The realizable compositions give a bandgap range of approximately 1.25 eV through 0.73 eV. Optical transitions are believed to be direct throughout this mole fraction range. FIG. 20 is adapted from the reference book by Casey and Panish, "Heterostructure Lasers Part B: Materials and Operating Characteristics", pp. 38–41, Academic Press, New York, 1978.

EXAMPLE 5

Figure 21:
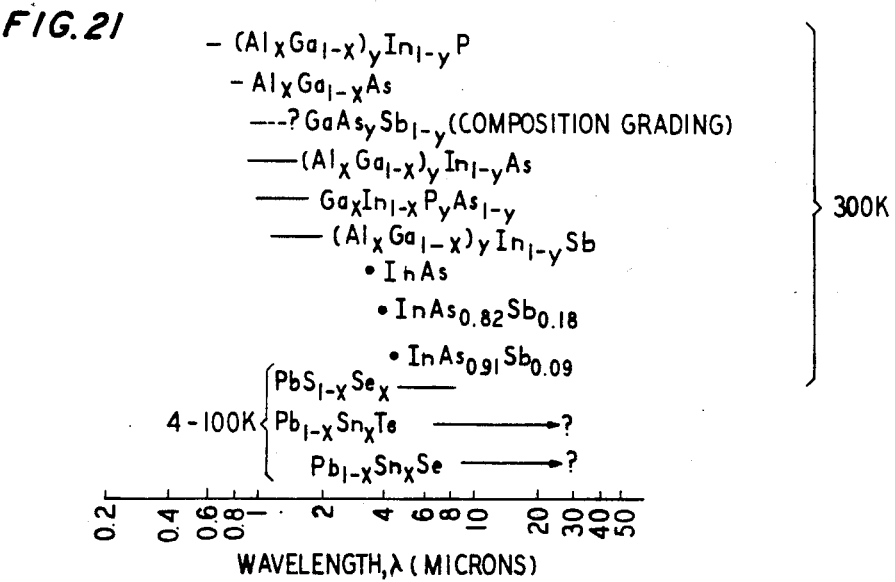
FIG. 21 is a chart showing ranges of emission wavelength for materials useful in making MQW structures.

Referring to FIG. 21, the bandgap, expressed as an emission wavelength, of several compounds which are potentially useful in making a MQW structure 120 and which may be grown epitaxially as lattice matched to a crystal substrate are illustrated. These materials are potentially useful in construction of MQW structures for use in nonlinear optical signal processing devices. The requirements for use in MQW construction are that the materials have different bandgaps so as to form potential wells in the conduction band and valence band; may be epitaxially grown with their lattice matched to the lattice of a substrate crystal; and have direct optical transitions from valence band to conduction band for the useful range of mole fractions.

EXAMPLE 6

Figure 22:
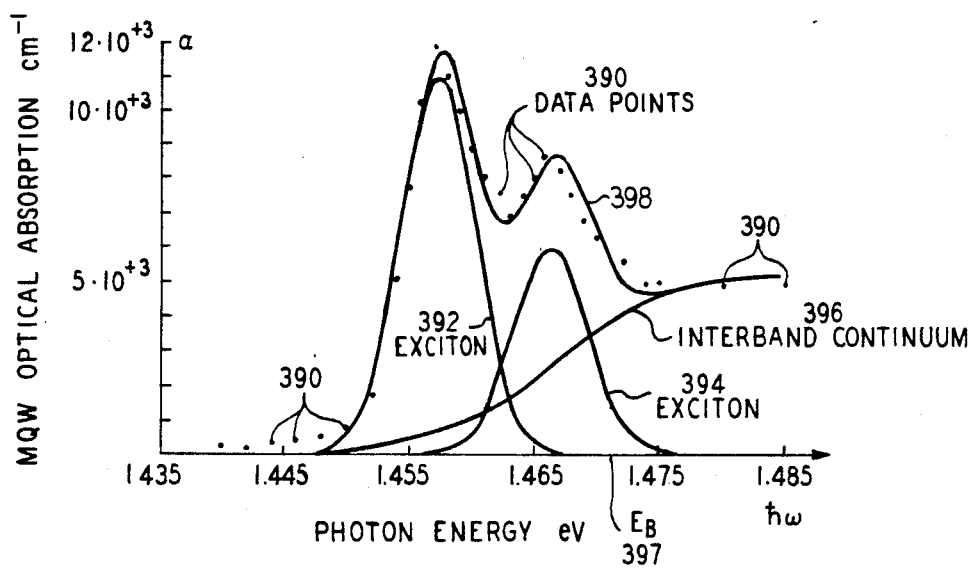
FIG. 22 is a graph showing optical transmission data taken using a $GaAs-Al_xGa_{1-x}As$ MQW and fits to the data.

Detailed optical absorption data for a MQW structure 120 fabricated from GaAs as the low bandgap material and $Al_xGa_{1-x}As$ as the wide bandgap material is given in FIG. 22. Data points 390 give the measured optical absorption at room temperature for the MQW device 100. The data points 390 show a peak of approximately $12.10^3$ cm$^{-1}$ at a photon energy of 1.455 eV and a second peak of approximately $8.5.10^3$ cm$^{-1}$ at a photon energy 1.465 eV. The data are fit by three structures, first an exciton absorption peak 392 of maximum absorption of $11.10^3$ cm$^{-1}$ at a photon energy of 1.457 eV and linewidth of 0.003 eV, a second exciton peak 394 of maximum absorption of $6.3.10^3$ cm$^{-1}$ at a photon energy of 1.466 eV and linewidth of 0.003 eV, and thirdly a continuum absorption curve 396 with a maximum absorption of $2.8.10^3$ cm$-1$ with a bandgap energy edge 397 at a photon energy of 1.467 eV and an energy tail of 0.005 eV. The data shown in FIG. 22 was taken at an intensity sufficiently low that no saturation of the absorption would be expected to be visible. A total fitted curve 398 is calculated by adding the contributions of the aforesaid three processes.

EXAMPLE 7

Figure 23:
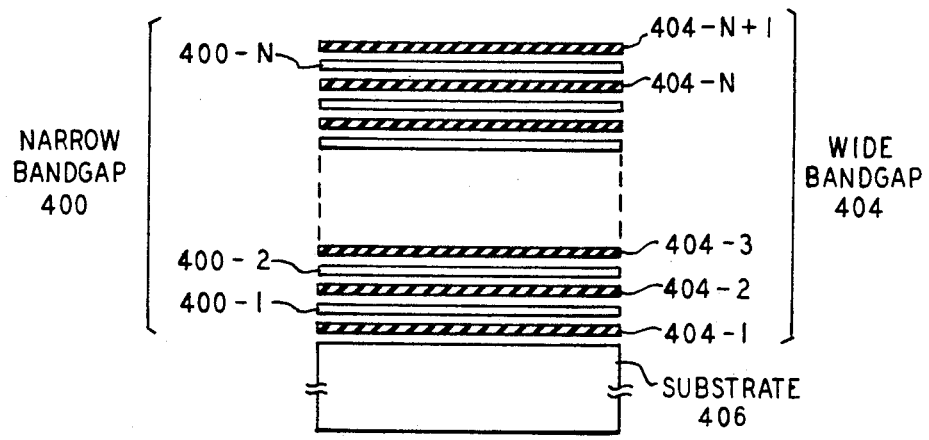
FIG. 23 is an end view of a multiple layer heterostructure.

A MQW structure may be made from epitaxially grown heterogenous layers in which the two types of materials used are: first, a narrow bandgap semiconductor material to form charge carrier layers; and second, a wide bandgap material to form charge barrier layers. Referring to FIG. 23, there is shown epitaxially grown layers of narrow bandgap semiconductor material 400-1 to 400-N, and alternate layers of epitaxially grown wide bandgap material 404-1 to 404-N+1. Substrate 406 supports the alternate layers of narrow bandgap material 400-1 to 400-N and the layers of wide bandgap material 404-1 to 404-N+1, and the layers are grown epitaxially one upon the other. The epitaxially grown alternate layers of narrow bandgap semiconductor material 400-1 to 400-N and wide bandgap material 404-1 to 404-N+1 as shown in FIG. 23 may be conveniently referred to as a multiple layer heterostructure.

Figure 24:
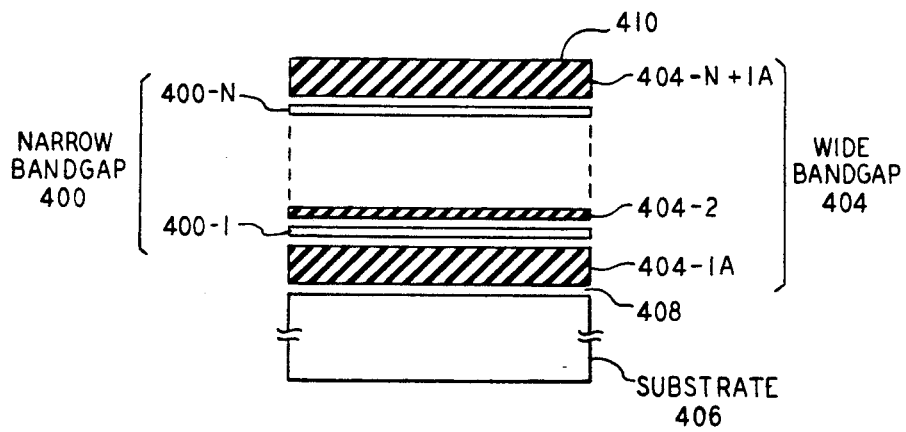
FIG. 24 is an end view of a multiple layer heterostructure and shows capping layers.

As an alternate design for a multiple layer heterostructure, there is shown in FIG. 24 capping layers 404-1A and 404-N+1A. The capping layers 404-1A and 404-N+1A are the first and last wide bandgap layers, and they are made thicker than the layers 404-2 to 404-N which separate layers of narrow bandgap material. An internal capping layer 404-1A may be epitaxially grown on substrate 406 in order, for example, to cover over any imperfections in the upper surface 408 of substrate 406. An external capping layer 404-N+1A may serve to protect the underlying thinner layers from mechanical injury. Further, the upper surface 410 of external capping layer 404-N+1A may be shaped or treated to serve as a partially reflecting mirror, or surface 410 may serve to attach the multiple layer heterostructure 412 to an external device (not shown), or surface 410 may serve as the side of an optical waveguide used to direct a beam of light to propagate substantially parallel to the layer planes 400-1 to 400-N and 404-1 to 404-N+1. Surface 410 and external capping layer 404-N+1A, or internal capping layer 404-1A, may serve additional purposes which will be apparent to those skilled in the art of optical devices.

Capping layers 404-1A and 404-N+1A correspond to the $Al_xGa_{1-x}As$ layers 118 and 124 shown in FIG. 1. Also the $In_{1-x-y}Ga_xAl_yAs$ multiple layer heterostructure shown in FIG. 19 could be made with capping layers 404-1A and 404-N+1A. Capping layers 404-1A and 404-N+1A are normally made from the wide bandgap material which forms the charge barrier layers, and so additionally serve the function of preventing charges from leaking out of the narrow bandgap charge carrier material.

The narrow bandgap layers 400-1 to 400-N are charge carrier layers and each layer forms a quantum well. The width of the quantum well is determined by the thickness of the narrow bandgap material. The barrier height for the quantum well is determined by the difference between the conduction bands and between the valence bands of the narrow bandgap material 400-1 to 400-N and the wide bandgap material 404-1 to 404-N+1. The barrier heights at the junction between epitaxially grown narrow bandgap and wide bandgap materials are shown in FIG. 11 for the $GaAs-Al_xGa_{1-x}As$ case. In FIG. 11 both the conduction band barrier 243 and the valence band barrier 245 are shown.

The wide bandgap material used for layers 404-1 to 404-N+1 need not be a semiconductor. The layers must be epitaxially grown upon the substrate 406, and one upon the other. The charge carriers produced by photon absorption within the layers of narrow bandgap material 400-1 to 400-N then may propagate throughout the entire epitaxially grown crystal with their motion limited only by the potential barriers which occur at the boundaries of narrow bandgap material and wide bandgap material, as is shown in FIG. 11 and FIG. 14 for the $GaAs-Al_xGa_{1-x}As$ case.

EXAMPLE 8

Figure 25:
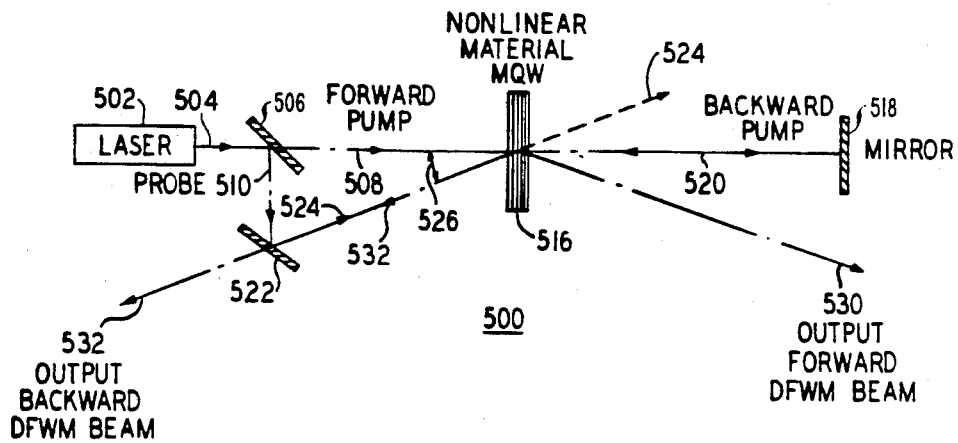
FIG. 25 is a schematic view showing production of both a forward and a backward DFWM phase conjugate light beam by a four-wave mixer.

Referring to FIG. 25, there is shown a degenerate four-wave mixer (DFWM) 500. Laser 502 produces output beam 504 which is split by mirror 506 into a pump beam 508 and a probe beam 510. Pump beam 508 intensity is conveniently chosen as approximately 10 times probe beam 510 intensity. However, other intensity ratios may be used between pump 508 and probe beam 510 intensities. Pump beam 508 may alternatively be referred to as the forward pump beam. Forward pump beam 508 passes through nonlinear optical material 516 and then reflects off mirror 518 after which it reenters the nonlinear material 516 as the backward pump beam 520. Forward pump beam 508 and backward pump beam 520 are normally adjusted so as to propagate in opposite directions and to spatially overlap within nonlinear material 516. A mutliple quantum well structure may be used for the nonlinear material 516, as is shown in FIG. 25.

Probe beam 510 reflects from mirror 522 where it becomes beam 524 which passes through the nonlinear material 516. Angle 526 between forward pump beam 508 and probe beam 524 is conveniently kept small, between 1° and 20°, in order to promote spatial overlap of the pump beams 508 and 520 with the probe beam 524 within the nonlinear material 516. Space and time coherence between the pump beams 508, 520 and the probe beam 524 within nonlinear material 516 are desirable in order to promote the four-wave mixing process.

The four-wave mixing process is the creation of a time dependent polarization within nonlinear material 516 which radiates electromagnetic waves. The strength of the radiated electromagnetic waves is proportional to the product of three indicident electromagnetic wave field strengths. Detailed mathematical analysis of the four-wave mixing process may be found in the literature, as for example in the article by A. Yariv. "Phase Conjugate Optics and Real Time Holography", published in *Institute of Electrical and Electronic Engineers (IEEE) Journal of Quantum Electronics, Vol. QE-14*, No. 9, September 1978, page 650, and the article by D. Block et. al., "Dispersive Character and Directional Anisotropy of Saturated Susceptibilities in Resonant Backward Four-Wave Mixing", published in *Physical Review Letters, Vol.* 49, September 1982, page 719, and all of the reference cited therein. An important feature of four-wave mixing is that the strength of the radiated electromagnetic wave may be greatly increased when the energy of the incident light waves is near a resonant optical transition within the nonlinear material, and this feature is further described in the above-referenced articles, and the reference cited therein. Degenerate four-wave mixing (DFWM) is a four-wave mixing in which all electromagnetic waves involved in the process have substantially the same frequency.

A quantitative analysis of DFWM can be made on the basis of a model which assumes that a grating of optical properties is produced within the nonlinear material by interference between two of the electromagnetic beams, and the third electromagnetic beam scatters from this grating. In the small signal regime, the first order diffractive efficiency of such a grating in the absence of nonlinear absorption is given by equation (3):

$$\rho \simeq \left[ \frac{2\pi}{\lambda} n_{eh} \right]^2 N l_\alpha e^{-\alpha l} \quad (3)$$

where:
$\rho$ is the diffraction efficiency;
$n_{eh}$ is the change in refractive index induced by one electron-hole pair per unit volume;
$\pi = 3.14159\ldots$;
$\lambda$ is the wavelength in vacuum of the incident light waves;
N is the number of density of electron-hole pairs created by the light beams, when applied as a short pulse to the nonlinear material;
$\alpha$ is the absorption coefficient
$l_\alpha = (1 - e^{-\alpha l})/\alpha$;
and
N as used above is given by $$N = \frac{\alpha}{\hbar \omega} \int I(t) dt$$

and:

$\pi\omega$ is the photon energy;

I is the intensity;

and the integral extends over the time duration of the optical pulse. In the case of backward four-wave mixing $I(t)$ should be replaced by $\sqrt{I_1(t)I_2(t)}$ where $I_1(t)$ is the intensity of the forward pump wave and $I_2(t)$ is the intensity of the backward pump wave.

The quantitative analysis of DFWM is more fully discussed in the above-mentioned references and also by H. J. Eichler et. al. in the article "Diffraction Efficiency and Decay Times of Free Carrier Gratings in Silicon", published in *Journal of Applied Physics*, Vol. 53, April 1982, p. 3237, and references cited therein.

As a result of the DFWM process employing both a forward pump beam 508 and a backward pump beam 520, there are produced an output forward DFWM phase conjugate beam 530 and an output backward phase conjugate beam 532. An important property of both output beams, forward 530 and backward 532, is that the phase of the output beams is the conjugate of the probe input beam.

EXAMPLE 9

Figure 26:
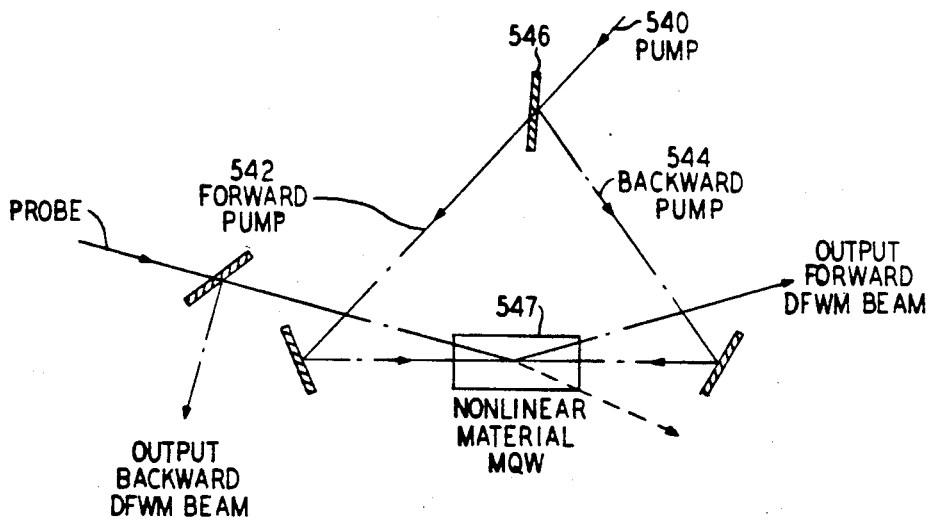
FIG. 26 is a schematic view of an alternate four-wave mixer.

Referring to FIG. 26, there is shown an alternate embodiment of a DFWM. Pump beam 540 is split into a forward pump beam 542 and a backward pump beam 544 by mirror 546. An advantage of the embodiment shown in FIG. 26 over that shown in FIG. 25 is that the backward pump beam 544 may be adjusted in intensity independent of the intensity of forward pump beam 542, and may be adjusted to greater intensity than forward pump beam 542. In FIG. 25 the backward pump beam 520 must first pass through the nonlinear material 516 where it undergoes attenuation, and so it cannot be adjusted to greater intensity than forward pump beam 508. Nonlinear material 547 may be a multiple quantum well structure, as shown in FIG. 26. The planes of the MQW structure may be arranged at a convenient angle with the pump beams, for example either perpendicular as shown in FIG. 25, or parallel to the pump beam direction, or any other convenient orientation.

EXAMPLE 10

Figure 27:
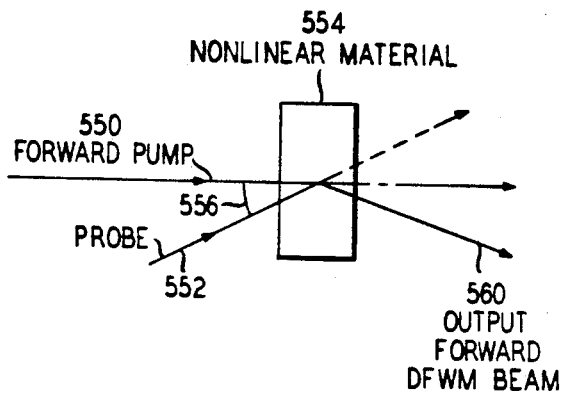
FIG. 27 is a schematic view showing production of only a forward phase conjugate light beam by a four-wave mixer with only a forward pump beam.

Referring to FIG. 27, there is shown an embodiment of the invention in which no backward pump beam is employed. Forward pump beam 550 and probe beam 552 are incident upon nonlinear material 554 at an angle 556. Both forward pump beam 550 and probe beam 552 must be of the same frequency and must be phase coherent. As a result of the DFWM process, forward pump beam 550 and probe beam 552 interact with nonlinear material 554 to produce output DFWM beam 560 which is phase conjugate with probe beam 552. A simplified explanation of the DFWM process is that the forward pump beam 550 and probe beam 552 interfere within nonlinear material 554 where they produce a grating of optical properties due to nonlinear optical processes, and the forward pump beam 550 then scatters off of that grating to produce output forward DFWM beam 560. No backward output beam can be produced by DFWM in the absence of a backward pump beam, as is shown in FIG. 27.

EXAMPLE 11

Figure 28:
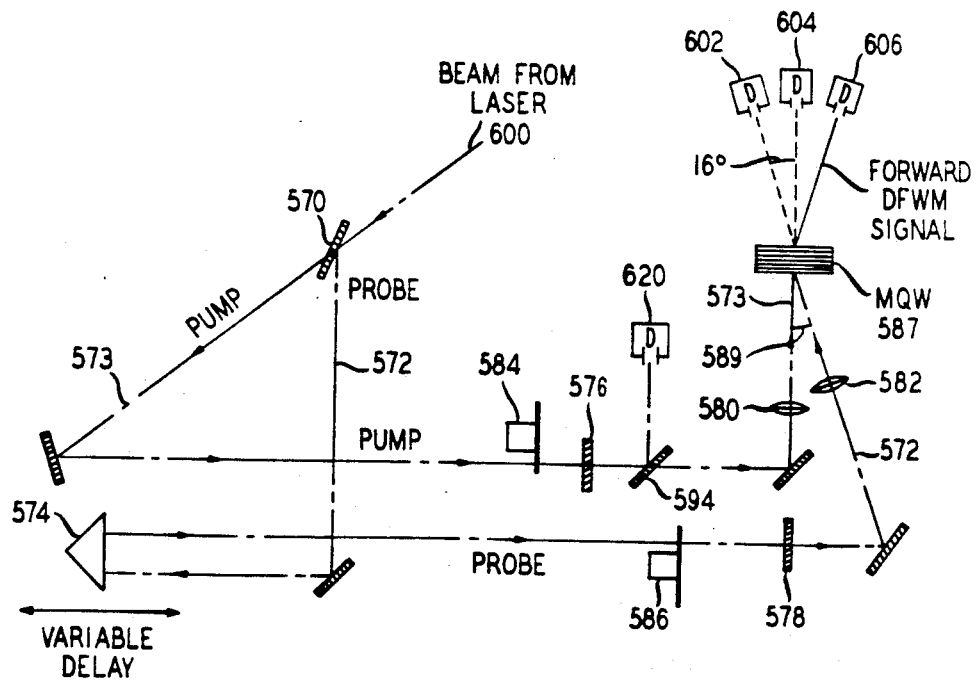
FIG. 28 is a schematic view showing apparatus used to measure the nonlinear susceptibility of a sample using DFWM.
Figure 31:
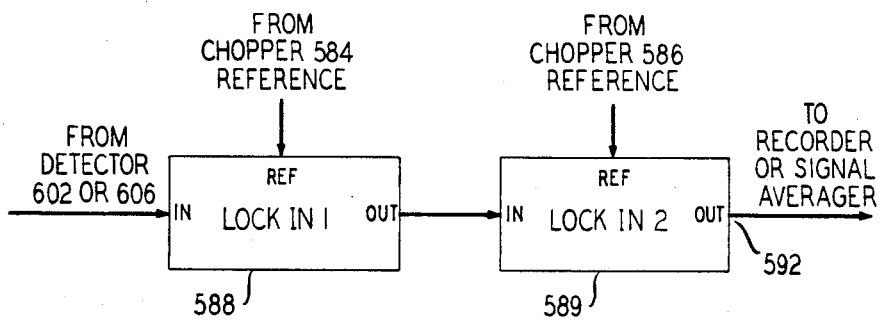
FIG. 31 is a schematic view showing the electronics including lock-in amplifiers of a test arrangement to observe DFWM.

Referring to FIG. 28, there is shown an experimental arrangement in which DFWM processes were measured as a result of nonlinear optical processes in a GaAs-$Al_xGa_{1-x}As$ multiple quantum well (MQW). The DFWM processes were measured in the photon energy region of the room temperature exciton absorption exhibited by the MQW samples. Beam splitter 570 generates the probe beam 572 which goes through the optical delay line consisting of corner cube prism 574 on a motorized translator (not shown). Pump beam 573 passes through beam splitter 570. The beams may be attenuated by neutral density filters, the pump beam by variable filter 576 and the probe beam by fixed filter 578. The beams are focused by lens 582 for the pump beam and lens 586 for the probe beam (15 cm and 12 cm focal length, respectively) onto the same spot on the MQW sample 587. Detectors 602, 604, 606 are silicon photodiodes. Chopper 584 and 586 are set at 385 Hz and 10 Hz respectively. Pump beam 573 and probe beam 572 enter MQW 587 at an angle 589. Angle 589 was chosen to be 16°. When the output of detector 602 or detector 606 is passed onto the chain of two lock-in amplifiers, FIG. 31, lock-in 1 588 and lock-in 2 589, only those signals which depend on the product of pump and probe beams given an output 592 from lock-in 2 589, thus suppressing all linear scatter. Lock-in 1 588 and lock-in 2 589 are operated with 30 ms and 1s time constants respectively. Detector 620 monitors laser power which is sampled by beam splitter 594.

The MQW samples were grown by molecular beam epitaxy on GaAs substrates, with the MQW layers sandwiched between GaAlAs cap layers which are transparent at the wavelengths of interest here. One sample consisted of 84 periods of 144 Angstroms GaAs and 102 Angstroms $Al_{0.3}Ga_{0.7}As$ (giving a total MQW thickness of $\simeq 2.1$ $\mu$m) with 0.3 $\mu$m $Al_{0.3}Ga_{0.7}As$ caps, and another had 65 periods of 96 Angstroms GaAs and 98 Angstroms $Al_{0.28}Ga_{0.72}As$ (giving a 1.26 $\mu$m MQW thickness) with 1.45 $\mu$m caps. The samples were cleaved to $\simeq 1$ mm square pieces, the GaAs substrate was removed with a selective etch and the resulting epitaxial layer glued to a sapphire disc with a $\lesssim 2$ $\mu$m layer of epoxy. For the 96 Angstrom MQW, a thin piece of glass was also glued over the sample. The sapphire and thin glue layers were used to avoid thermal effects. The experimental apparatus is shown in FIG. 28. An oxazine 750 ring dye laser (not shown) was synchronously pumped with a Spectra-Physics 171 Krypton laser (not shown) giving modelocked pulses spaced 12 ns apart in beam 600. The dye laser was tuned under computer control using two birefringent plates and gave pulses of second harmonic generation autocorrelation half-height width $\simeq 6$ ps without a significant coherence spike. The focused spot sizes on the sample were $\simeq 45$ $\mu$m and $\simeq 30$ $\mu$m $1/e^2$ intensity diameter for pump and probe beams respectively. For the $\lesssim 2$ $\mu$m active length in our samples, the slight phase mismatch in forward DFWM may be neglected. Detector 602 detects the change in transmission of the probe beam 572 due to the pump beam (i.e. transferred nonlinear absorption). Detector 604 measures transmission and detector 606 detects the DFWM signal.

Figure 29:
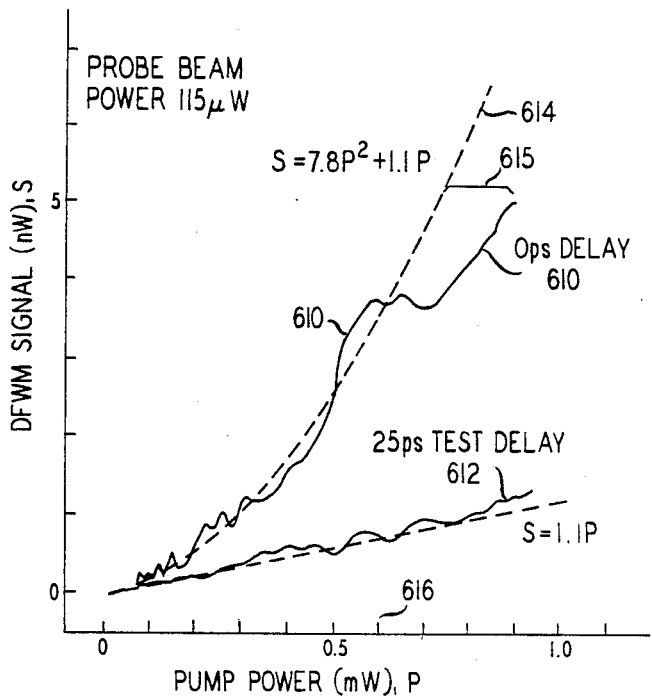
FIG. 29 is a graph showing the strength of a DFWM phase conjugate output signal versus pump power using a $GaAs-Al_xGa_{1-x}As$ MQW.

A DFWM signal with a half-height width of 3.1 ps was observed near the exciton peaks on detector 606 in the vicinity of zero pump-probe delay. FIG. 29, curve 610, shows the dependence of detector 606 signal on pump intensity at 1.440 eV (near the heavy hole exciton peak) for the 144 Angstrom MQW sample. With 25 ps delay between probe and pump, the signal on detector 606 varies linearly with intensity as shown by curve 612, FIG. 29, which is interpreted as scattered nonlinear absorption. As the nonlinear absorption spectrum is experimentally identical for 0 delay and 25 ps test delay, we include this scatter together with the quadratic term in the dashed fit at 0 delay. Thus, the fit curve 614 confirms that the DFWM signal increases quadratically as expected up to ≃0.6 mW average pump power. The quadratic dependence of DFWM signal S versus pump power P is seen by the dashed fit curve 614 given by the expression:

$$S = 7.8P^2 + 1.1P.$$

The roll-off 615 at higher powers, above approximately 0.6 mW 616, is most probably due to saturation of the nonlinearity. Subsequent measurements used powers <0.6 mW. Allowing for reflection losses, there were attained diffraction efficiencies of ≃$10^{-4}$ with ≃0.5 mW average pump power incident on the 96 Angstrom sample.

Figure 30:
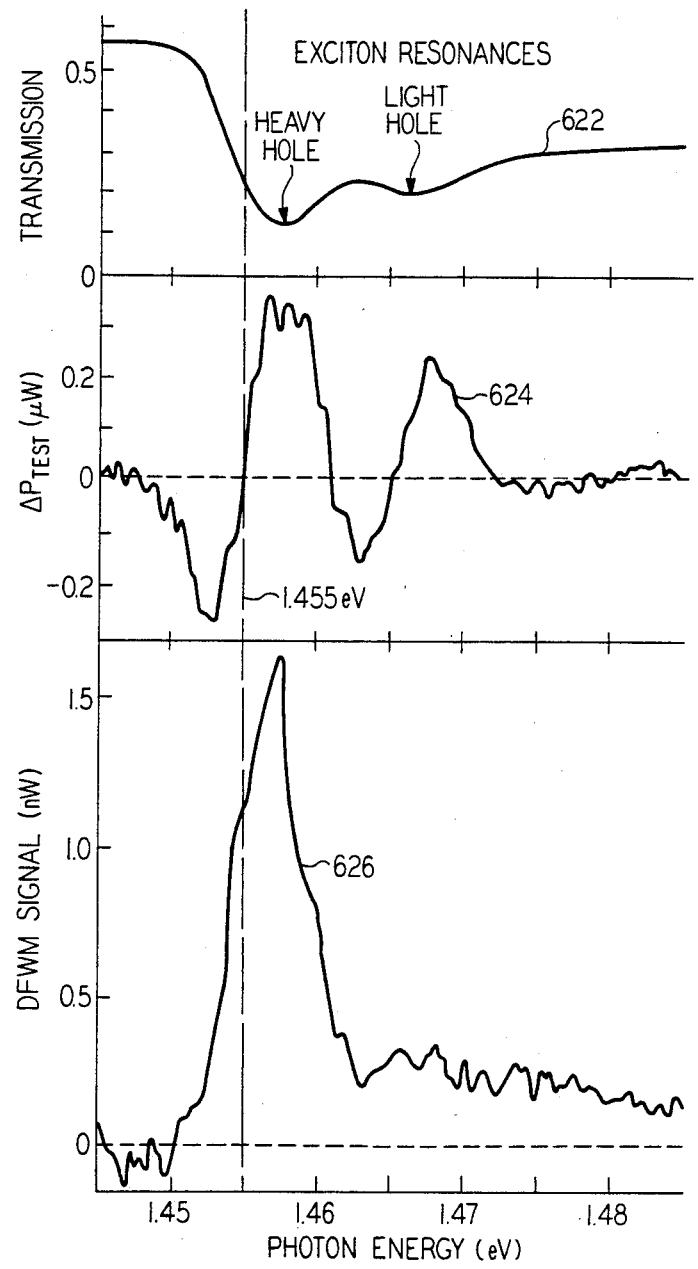
FIG. 30 shows graphs of linear absorption, nonlinear absorption and DFWM signal versus incident photon energy for a $GaAs-Al_xGa_{1-x}As$ MQW.

Spectra were taken under similar conditions on detectors 602, 604, and 606, while simultaneously recording the laser power using detector 620. FIG. 30, curve 622, shows the linear transmission spectrum obtained from the detector 604 and detector 620 spectra. FIG. 30, curve 624, shows the signal from detector 602 after processing by a chain of lock-in amplifiers shown in FIG. 31 (with 25 ps probe beam delay). FIG. 30, curve 624 is the change in transmitted probe beam power as a function of wavelength, and it is therefore a measure of the nonlinear absorption. FIG. 30, curve 626, shows the DFWM signal from detector 606 after the lock-in amplifiers taken near zero time delay; this spectrum has the scattered nonlinear absorption signal, as measured on detector 606 with the probe beam 572 delayed ≃25 ps after the pump, subtracted from it. No reflection corrections have been applied in FIG. 30, and curves 624 and 626 are not corrected for the slight variation in laser power across the spectrum. Qualitatively similar spectra were observed with the 144 Angstrom sample although the peaks occur at lower energies (≃1.443 and ≃1.450 eV) and are less clearly resolved.

The DFWM signal shows a clear peak in FIG. 30, curve 626, near the heavy hole exciton resonance. The nonlinear absorption spectrum is more complicated and we interpret it as follows. At the heavy hole exciton peak, the transmission of the probe beam is increased by the presence of the pump beam, whereas on either side of this peak there is a clear decrease in transmission; and this behavior is consistent with a broadening of the heavy hole exciton peak with increasing intensity. This behavior contrasts with low-temperature behavior which shows a peak shift, as shown by Hegarty et. al. in the article "Resonant Degenerate Four-Wave Mixing in GaAs Multiquantum Well Structures", published in *Applied Physics Letters*, January 1982, at pp. 132-134. There is also some evidence of the same phenomena for the light-hole exciton peak. The important point is that where the nonlinear absorption crosses zero (e.g., at ≃1.455 eV) the DFWM is still large. We carefully confirmed this fact and also observe a similar phenomenon for the 144 Angstrom sample. As the DFWM arises from either absorptive or refractive effects, the existence of DFWM in the absence of nonlinear absorption is a direct proof of the existence of nonlinear refraction. The value of the effective nonlinear coefficient can be obtained from the magnitude of the DFWM signal.

Interpretation of the DFWM magnitude requires some care because of the existence of grating diffusion. The interference of pump and probe beams for our conditions (i.e. angle 589 between pump and probe beams of 16°) produces a carrier grating inside the material of spacing ≃3.0 μm, which gives rise to the DFWM signal. Using a hole mobility of ≃400 $cm^2$/Vs (appropriate for pure GaAs) we calculate a grating "lifetime" ≃120 ps so the grating completely disappears in the 12 ns between pulses. The actual carrier lifetime is much longer than this (we measure ≃20 ns in these experiments for both samples using the method described by Miller et. al. in the article "Large Room Temperature Optical Nonlinearity in GaAs/Ga$_{1-x}$Al$_x$As Multiple Quantum Well Structures", published in *Applied Physics Letters*, Vol. 41, October 1982, at pages 679-681.)

To analyze the results of the above-mentioned measurements quantitatively at the point of zero nonlinear absorption, the change in refractive index ($n_{eh}$) induced by one electron-hole pair per unit volume is employed. The grating diffuses completely between pulses but negligibly during each pulse, and therefore the DFWM signal depends on the number density of electron-hole pairs created by each pulse, $N = (\alpha/\pi\omega) \int I(t)dt$ where I is the intensity, α is the absorption coefficient and πω is the photon energy. In the small signal regime, the first order diffraction efficiency of such a grating when there is no nonlinear absorption is given by equation (3). In equation (3) l is the thickness of the active (i.e. MQW) material. The effects of large absorption are accounted for through the effective interaction length $l_\alpha = (1 - e^{-\alpha l})/\alpha$ and the factor $e^{-\alpha l}$. To relate equation (3) to beam power, we used the exact deconvolution technique for Gaussian beams given by Kolodner et. al. in the article "Exact Decomposition of a Gaussian Averaged Nonlinear Function", published in Optics Letters, Vol. 4, January 1979, at page 38. The following results are derived from the above-mentioned measurements, including corrections for surface reflections: for the 144 Angstrom MQW at 1.444 eV just below the heavy hole exciton peak where $\alpha = 0.72 \times 10^4$ $cm^{-1}$, $|n_{eh}| = 2.1 \times 10^{-19}$ $cm^{-3}$; for the 96 Angstrom MQW at 1.457 eV where $\alpha = 1.2 \times 10^4$ $cm^{-1}$, $|n_{eh}| = 2.5 \times 10^{-19}$ $cm^{-3}$. For steady state nonlinear refraction with cw beams for times much longer than the carrier lifetime (≃20 ns), these figures imply nonlinear refraction coefficients $|n_2|$ of $1.2 \times 10^{-4}$ $cm^2$/W for the 144 Angstrom MQW, and $2.5 \times 10^{-4}$ $cm^2$/W for the 96 Angstrom MQW. An accuracy of ≃ a factor of 2 is estimated in these results.

We observed degenerate four-wave mixing at room temperature in multiple quantum well material near the exciton peaks. With average intensities ≃30 W/$cm^2$, we observed diffraction efficiencies ≃$10^{-4}$ in samples only 1-2 μm thick. The signals arose from both nonlinear absorption and nonlinear refraction, and we measured $n_{eh}$, the carrier density dependence of refractive index to be ≃$2 \times 10^{-19}$ per excited carrier pair per $cm^3$. The fact that these large room-temperature nonlinearities are seen at low powers (<1 mW) and at wavelength (≃850 nm) ideally suited to diode lasers leads us to conclude that MQW structures are the key to practical optical devices for further optical communications and signal processing systems.

EXAMPLE 12

Important practical uses of DFWM include: production of a phase conjugate beam which may be used to cancel phase distortions from a probe beam; as an optical coincidence gate in which no DFWM output beam is present unless both the probe and pump beams are simultaneously present within the nonlinear material, as an amplifier, as a mirror for a laser cavity, and for image corrections using the phase conjugate output beam.

EXAMPLE 13

Figure 32:
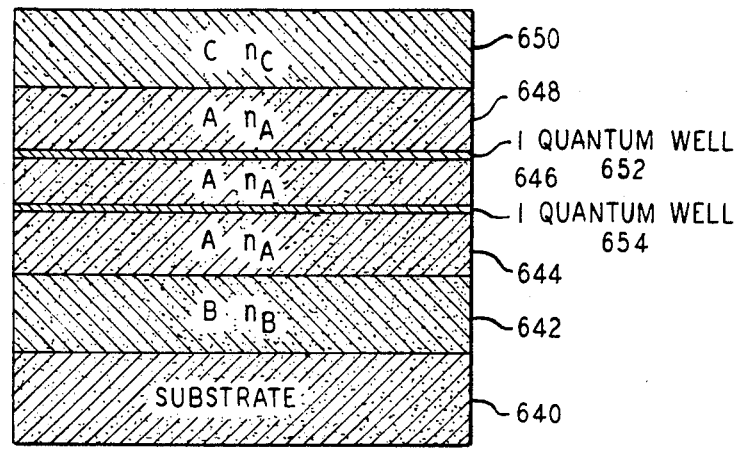
FIG. 32 shows a side view of an optical waveguide containing two quantum well structures.

Referring to FIG. 32, there is shown an alternative embodiment of a four-wave mixer. Substrate 640 provides a support upon which subsequent layers are epitaxially grown. Layer 642, designated B in FIG. 32, is made from, for example, doped semiconductor material, is grown substantially epitaxially upon substrate 640, and is characterized by an index of refraction designated $n_B$. Layer 642 serves as a first cladding layer for a dielectric optical waveguide. The layer designated A in FIG. 32 is shown divided into layers 644, 646, 648, is made from, for example, doped semiconductor material, is grown substantially epitaxially upon layer 642, serves as the core of a dielectric optical waveguide, and is characterized by an index of refraction $n_A$. Layer 650, designed as C in FIG. 32, is made from, for example, doped semiconductor, is grown substantially epitaxially upon layer 648, is characterized by an index of refraction $n_C$, and serves as a second cladding layer for a dielectric optical waveguide. Layers 642, and 644, 646, 648, and 650 form a dielectric optical waveguide in which the optical electromagnetic wave is confined substantially within layers 644, 646, 648. The indices of refraction for the layers are chosen to obey the equations, $n_B < n_A$ and $n_C < n_A$. Layer A, in which the electromagnetic wave is substantially confined, contains a few spaced single quantum wells, two of which are shown and are designated by reference numerals 652 and 654. Lightwaves propagate in layer A, 644, 646, 648 and interact with quantum well structures 652, 654. The nonlinear optical properties of quantum wells 652, 654 provide four-wave mixing between lightwaves propagating in layer A 644, 646, 648.

For example, in an exemplary embodiment, layer 642 may be made of $Al_xGa_{1-x}As$, layer A 644, 646, 648 may be made of $Al_yGa_{1-y}As$, layer 650 may be made of $Al_zGa_{1-z}As$, and also the quantum wells 652, 654 may be made of $Al_wGa_{1-w}As$. The mole fractions x, y, z, w of the various layers are chosen in accordance with the limitations set forth hereinabove with regard to bandgap height and index of refraction.

As additional exemplary embodiments, layers 642, 644, 646, 648, 650 and quantum wells 652, 654 may be made from quaternary materials such as $In_{1-x-y}Ga_xAl_yAs$ or $Ga_xIn_{1-x}P_yAs_{1-y}$, so long as the mole fractions for the various layers are chosen in accordance with the bandgap and index of refraction requirements set forth hereinabove.

Figure 33:
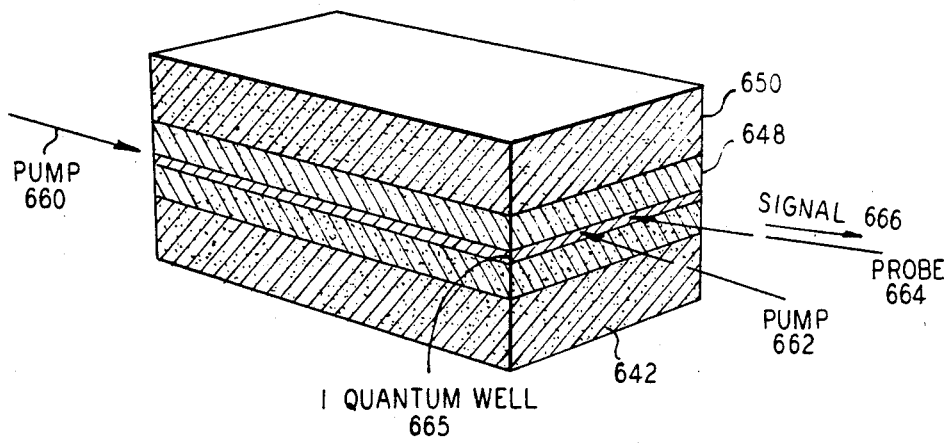
FIG. 33 is an isometric view showing a waveguide structure containing one quantum well.

Referring to FIG. 33, there is shown an isometric view of the embodiment shown in FIG. 32 in which the propagation of pump beams 660, 662, and probe beam 664 are shown propagating in the plane of the layer 644, 648. In FIG. 33 only one single quantum well 665 is shown. Also no substrate is shown. An output signal beam 666 resulting from backward four-wave mixing is shown.

The embodiments shown in FIG. 32 and FIG. 33 use only a few quantum well structures because the lightwave propagates so that it illuminates the quantum well structures over long distances, that is over distances on the order of millimeters or centimeters. Only a few single quantum well structures are needed for such an extended contact between the quantum well and the propagating lightwave. Only one quantum well, as shown in FIG. 33, may in some embodiments be satisfactory. In other embodiments it is convenient to use two quantum wells as shown in FIG. 32, and in other embodiments to use a larger number of quantum wells, as are needed to provide sufficient contact between the lightwaves and the quantum wells.

EXAMPLE 14

Figure 34:
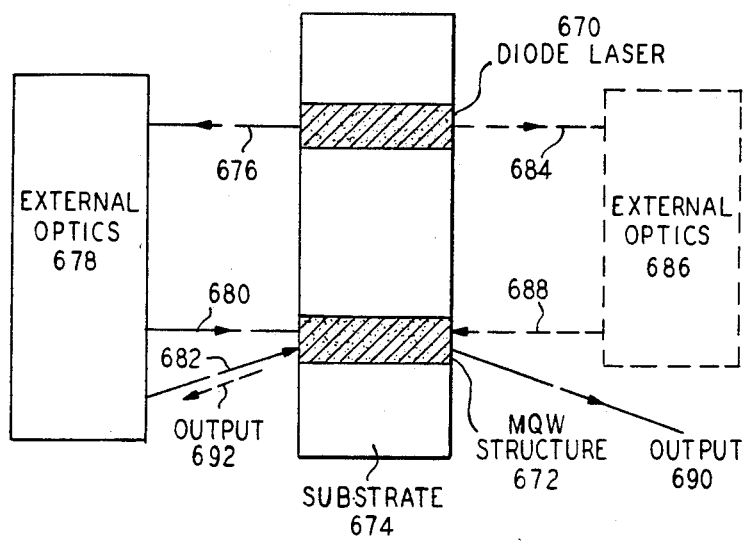
FIG. 34 is a top view showing a four-wave mixer in which a diode laser and a MQW structure are both grown on the same substrate.

Referring to FIG. 34, there is shown as one example a diode laser 670 and a multiple quantum well structure 672 grown on a single substrate 674. Output beam 676 is directed into an external optics 678, and from external optics 678 into MQW structure 672 as beams 680, 682. Alternatively, output beam 684 is directed into external optics 686. From external optics 686 a beam 688 may be directed into MQW structure 672. Output beams 690, 692 may be produced by four-wave mixing processes within MQW structure 672. Output beam 690 results from forward four-wave mixing of input beams 680, 682. Output beam 692 results from backward four-wave mixing of input beams 680, 682, and 688.

EXAMPLE 15

Figure 35:
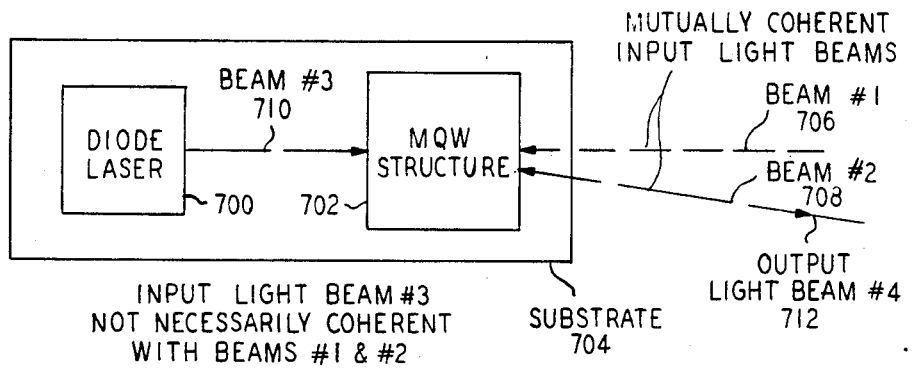
FIG. 35 is a top view of a four-wave mixer in which a diode laser and a MQW structure are grown on the same substrate.

Referring to FIG. 35, there is shown an exemplary embodiment in which diode laser 700 and MQW structure 702 are grown on the same substrate 704. Mutually coherent input light beams, beam No. 1 706 and beam No. 2 708, enter MQW structure 702 where they interfere and produce a grating of optical properties due to nonlinear optical processes. Input light beam, beam No. 3 710, which is not necessarily coherent with beams No. 1 and 2, 706, 708, scatters off the aforesaid grating of optical properties and produces output light beam No. 4 712. Output light beam No. 4 712 is produced by four-wave mixing between input light beam No. 1 706, beam No. 2 708, and beam No. 3 710.

EXAMPLE 16

Figure 36:
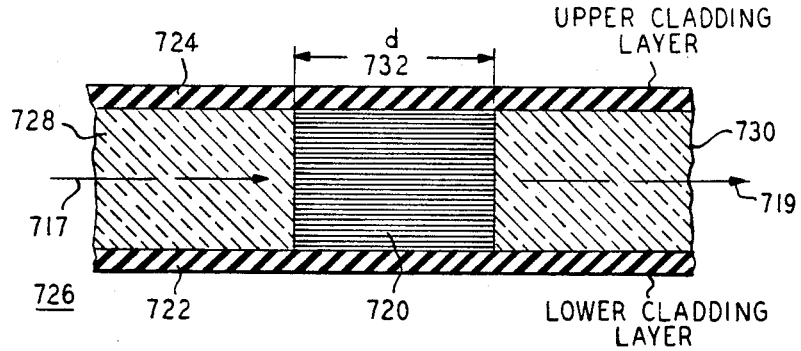
FIG. 36 is a side view of an optical waveguide in which light beams propagate substantially parallel to the planes of quantum wells.

Referring to FIG. 36, there is shown in side view an alternative exemplary embodiment in which the light beams 717, 719 in a four-wave mixer propagate parallel with the planes of an MQW structure 720. Layers 722 and 724 serve as cladding layers of dielectric optical waveguide 726. Layer 728 is a core layer of dielectric optical waveguide 726. Layer 730 may be made as an extension of layer 728. Distance d 732 gives the length of interaction which lightwaves may have with MQW structure 720. The number of individual quantum wells in MQW structure 720 is chosen in conjunction with the value of d 732 to obtain the required amount of nonlinear optical interaction. Such choices of numbers of quantum wells are also illustrated in FIG. 32 and FIG. 33. The structures shown in FIG. 32 and FIG. 36 may be regarded as side views of the apparatus shown in top view in FIG. 25, FIG. 26, FIG. 27, and FIG. 35, and, as so regarded, provide additional examples in which the lightwaves propagate substantially parallel to the planes of quantum well structures.

THEORY

The present invention discloses the use of a MQW as the nonlinear element in a degenerate four-wave mixer. The MQW has a number of desirable features including: (1) a resonant absorption peak in the MQW optical absorption spectrum which is observable at room temperature as a separate peak occurring at an energy below the interband transitions; (2) the resonant absorption is saturable at low light intensity; (3) the saturability is accompanied by a variation in the index of refraction; (4) the materials used to make the MQW are the same as those used to make heterostructure diode lasers, and so the laser and the MQW can be grown on the same substrate to form an integrated optical system; (5) the absorption peak of the MQW may be tuned to a convenient energy by varying the alloy composition of the layers of the MQW or by varying the thickness of the narrow bandgap layers; and other useful features.

It is believed that the resonant absorption which makes the MQW useful in nonlinear optical devices at room temperature is due to absorption accompanied by exciton creation. There follows an explanation of observed MQW optical properties in terms of an exciton absorption model.

A MQW structure may be made by building up alternate layers of a narrow bandgap semiconductor material and a wide bandgap material. The narrow bandgap material then serves as a charge carrier material. Charge carriers are produced within the narrow bandgap semiconductor material by photon absorption. The wide bandgap material serves as a charge barrier material. The narrow and wide bandgap materials are grown epitaxially one upon the other in thin layers of only a few tens to hundreds of Angstroms thickness. Many alternate layers of narrow and wide bandgap materials are employed in fabricating a MQW structure. The layers of wide bandgap material serve as charge barrier planes which trap the charge carriers within the thin layers of narrow bandgap materials.

Optical resonance absorption peaks 154 and 156 are observed at room temperature in the MQW absorption spectrum as shown in FIG. 4 in a GaAs-Al$_x$Ga$_{1-x}$As MQW. The low energy resonance 154 is observed to saturate at low incident light intensity, as shown in FIG. 6. This resonance is believed to be due to an exciton formed in the charge carrier, or narrow bandgap, material. The exciton is formed simultaneously with the absorption of a photon in the narrow bandgap material, as shown by transition 204 in FIG. 8. An exciton is an electron and a hole bound together by Coulomb attraction much as an electron is bound to a proton in a hydrogen atom. The exciton is an excited state of a crystal and so the dielectric constant of that crystal affects the binding energy of the exciton.

The exciton level 200 is shifted away from the conduction band of the narrow bandgap material by an amount equal to the exciton binding energy $E_B$ 201. For bulk GaAs the exciton binding energy is approximately 4.2 meV and the orbit radius is approximately 140 Angstroms. The binding energy of the exciton $E_B$ 201 is increased as a result of quantum effects arising from trapping of charge carriers within the thin layers of the narrow bandgap material. Layers of narrow bandgap material with thickness of the order of the diameter of an exciton orbit radius in bulk samples of the narrow bandgap material are employed. This increased binding energy $E_B$ 201 of the exciton and the consequent increased shift of the exciton level below the conduction band makes the exciton absorption resonance transition 204 observable at room temperature in a MQW. In a particular embodiment, the layers of GaAs were 102 Angstroms, the layers of Al$_{0.28}$Ga$_{0.72}$As were 207 Angstroms, the heavy hole exciton binding energy was 9 meV with an exciton orbit radius of approximately 60 Angstroms, and exciton peaks were observed at resonant energies of approximately 1.463 electron volts and 1.474 electron volts. The 1.463 eV resonant peak is thought to arise from the "light hole exciton" and the 1.474 eV resonant peak is thought to arise from the "heavy hole exciton". In a material such as GaAs in which there is more than one valence band, all valence bands may serve to form excitons. In MQWs because of the symmetry of the structure the two upper valence bands are split off giving rise to two holes with different effective masses in the direction perpendicular to the layers. A terminology which emphasizes the effective mass of the hole is used to distinguish the different possibilities such as the "heavy hole exciton" or the "light hole exciton".

An exciton, once formed as a result of photon absorption, has a relatively short lifetime. The exciton is most probably ionized by a lattice vibration phonon. The mean time to ionization of an exciton by a phonon is estimated to be $0.4 \times 10^{-12}$ sec. in GaAs at room temperature.

Enough layers of narrow bandgap material are utilized to supply the necessary optical absorption for device design. The resonant exciton absorption leads to a frequency dependent index of refraction which is related to the aforesaid absorption by the Kramers-Kronig relationship as illustrated in FIG. 13.

Further, the absorption of light by production of excitons is believed to saturate at low light intensities because excitons which are formed by absorption of a light photon have a short lifetime at room temperature. The exciton is ionized by a phonon which supplies the necessary energy. The exciton breaks apart upon ionization into a conduction band electron 206 and a valence band hole 208 as shown in FIG. 8. The lifetime of the conduction band electron and valence band hole is believed to be rather long at room temperature, approximately $21.10^{-9}$ sec. in the GaAs layers of MQW at room temperature. Therefore the population of electrons and holes will build up as more and more excitons are created by photon absorption and destroyed by phonon ionization. However, conduction band electrons and valence band holes comprise mobile charges within the semiconductor material. These charges interfere with the formation of more excitons through a screening effect. Thus as excitons are created, they are believed to break apart and the resulting electrons and holes interfere with the producton of more excitons. A negative feedback mechanism is therefore operative in which the creation of excitons makes further production of excitons less probable, and the resonant optical absorption decreases. The resonant optical absorption decreases when the rate at which excitons are formed exceeds the rate at which free electrons and holes recombine with a consequent increase in the population of conduction band electrons and valence band holes which behave as free charge carriers.

In summary, optical absorption which depends upon creation of excitons saturates with increasing light intensity at room temperature in MQWs. Saturation is thought to be so effective because a previously formed exciton breaks apart forming an electron and hole which interfere with and partially prevent the formation of new excitons.

Additional mechanisms by which exciton absorption may saturate include exciton-exciton collisions and also exhaustion of potential exciton-forming states in the conduction and valence bands. However, at room temperature the contributions of these mechanisms are believed to be substantially smaller than that of the screening induced by the rapid ionization of the excitons.

A second beam of light may be used to increase the density of charge carriers within the narrow bandgap semiconductor material and therefore reduce the probability of exciton formation. The MQW can then be used as a light valve in which its optical transmission is controlled by a second beam of light. The second beam of light undergoes photon absorption by any process, such as interband absorption or exciton absorption and therefore produces conduction band electrons and valence band holes. These conduction band electrons and valence band holes are free charge carriers which interfere with exciton production.

The energy of the photons in the second beam of light may exceed the bandgap energy, $E_G$ 242 as shown in FIG. 11 and FIG. 14, of the wide bandgap charge barrier material. Charge carriers produced in the wide bandgap material by photon absorption will rapidly migrate into the narrow bandgap material and there interfere with exciton production, and therefore reduce the resonant absorption due to exciton production. It is believed that as the resonant optical absorption decreases due to saturation effects, the index of refraction will also vary with the reduced absorption as given by the Kramers-Kronig relationship, and as illustrated in FIGS. 12 and 13.

It is to be understood that the above-described embodiments are simply illustrative of the principles of the invention. Various other modifications and changes may be made by those skilled in the art which will embody the principles of the invention and fall within the spirit and scope thereof.

What is claimed is:

1. A four-wave mixer comprising:
    a multiple quantum well (MQW) structure including a multiple layer heterostructure made from alternate layers of a charge carrier semiconductor material having a narrow bandgap energy, and a charge barrier material having a wider bandgap energy than said charge carrier material, said layers deposited one upon the other in substantially flat planes forming a series of potential barriers which result from the bandgap energy difference between said narrow and said wider bandgap energy, said potential barriers being oriented in the direction perpendicular to said layers and capable of confining charge carriers which arise within said layers of said charge carrier semiconductor material to remain substantially therein, and an optical absorption coefficient of said multiple layer heterostructure exhibits at least one sharp resonant optical absorption peak near said semiconductor material bandgap absorption;
    means for providing a first beam of light which propagates through said MQW structure; and
    means for providing a second beam of light which propagates through said MQW structure and substantially overlaps said first beam of light within said MQW structure so that at least one output phase conjugate beam of light is produced by interaction of said first and said second beams of light with said MQW structure.

2. The four-wave mixer as claimed in claim 1 wherein said apparatus operates at temperatures exceeding 100° K.

3. The four-wave mixer as claimed in claim 1 wherein said charge carrier semiconductor material is GaAs, said charge barrier material is $Al_xGa_{1-x}As$, and x has a value sufficiently large to provide substantial charge carrier confinement within said GaAs.

4. The four-wave mixer as claimed in claim 3 wherein the thickness of GaAs charge carrier semiconductor material is within the range of 30 Angstroms through 300 Angstroms and the thickness of $Al_xGa_{1-x}As$ charge barrier material is equal to or exceeds 30 Angstroms.

5. The four-wave mixer as claimed in claim 1 wherein said charge carrier semiconductor material is $Al_xGa_{1-x}As$ with a value of x chosen small enough to provide direct bandgap transitions,
    and said charge barrier material is $Al_xGa_{1-x}As$ with a value of x chosen larger than the value in said charge carrier semiconductor material so as to provide a wider bandgap for said charge barrier material than for said charge carrier material for providing substantial charge confinement within said charge carrier semiconductor material.

6. The four-wave mixer as claimed in claim 5 wherein said value of x for said charge carrier material and the value of x for said charge barrier material are chosen so that the bandgap of said charge barrier material exceeds the bandgap of said charge carrier material by at least 0.1 electron volts.

7. The four-wave mixer as claimed in claim 5 wherein said value of x for said charger carrier material is chosen in the range 0.0 through 0.43.

8. The four-wave mixer as claimed in claim 1 wherein said charge carrier semiconductor material and said charge barrier material are both selected from the group consisting of $In_{1-x-y}Ga_xAl_yAs$;
    said charge carrier semiconductor material having a smaller value of y than does said charge barrier material for providing a narrower bandgap energy for said charge carrier semiconductor material than is provided for said charge barrier material;
    and said charge carrier and said charge barrier materials are grown substantially epitaxially one upon the other.

9. The four-wave mixer as claimed in claim 8 further comprising an InP substrate and the value of x+y is chosen so that said layer grew lattice matched to said InP substrate.

10. The four-wave mixer as claimed in claim 1 wherein said charge carrier semiconductor material and said charge barrier material are both selected from the group consisting of $Ga_xIn_{1-x}P_yAs_{1-y}$, the values of x and y are chosen such that the bandgap energy of said charge barrier material exceeds the bandgap energy of said charge carrier semiconductor material;
    and said charge carrier and charge barrier materials are grown substantially epitaxially one upon the other.

11. The four-wave mixer as claimed in claim 1 wherein said charge carrier semiconductor material having a narrow bandgap energy, and said charge barrier material having a wider bandgap energy, are chosen so that they may be grown epitaxially both upon a substrate and alternately one upon the other, and said charge carrier semiconductor material is chosen to have a direct bandgap optical absorption transition.

12. The four-wave mixer as claimed in claim 1 wherein said sharp resonant optical absorption peak arises from at least one exciton resonance within said charge carrier material.

13. The four-wave mixer as claimed in claim 12 wherein the energy levels of said exciton resonance are adjusted during fabrication of said multiple layer heterostructure in order to adjust the energy of said sharp resonant optical absorption peak.

14. The four-wave mixer as claimed in claim 13 wherein said adjustment of the energy of said exciton resonance is accomplished by adjusting the thickness of the layers of said charge carrier material, so that the width of the potential wells experienced by said charge carriers is adjusted.

15. The four-wave mixer as claimed in claim 13 wherein said adjustment of the energy of said exciton resonance is accomplished by adjustment of the composition of said charge carrier semiconductor material so that said bandgap energy of said charge carrier semiconductor material is modified whereby the center of said resonance is moved as the bandgap moves.

16. The four-wave mixer as claimed in claim 13 wherein said adjustment of the energy of said exciton resonance is accomplished by adjustment of the composition of said charge barrier material, so that the bandgap energy of said charge barrier material is modified whereby the depth of the potential wells experienced by said charge carriers is adjusted.

17. The four-wave mixer as claimed in claim 13 wherein said at least one exciton resonance is adjusted to a photon energy range which corresponds to a minimum optical absorption in an optical fiber suitable for use in a lightwave communication system.

18. The four-wave mixer as claimed in claim 17 wherein said photon energy range corresponds to a 1.2 micron or a 1.6 micron range minima in optical fiber absorption.

19. The four-wave mixer as claimed in claim 12 wherein said at least one exciton resonance is adjusted to a photon energy range which corresponds to a minimum in optical dispersion in an optical fiber suitable for use in a lightwave communication system.

20. The four-wave mixer as claimed in claim 19 wherein said photon energy range corresponds to a 1.3 micron range or 1.55 micron range zero optical dispersion characteristic of optical fibers.

21. The four-wave mixer as claimed in claim 12 wherein in said multiple layer heterostructure the thickness of said charge carrier semiconductor material layers is chosen sufficiently large that fluctuations in said thickness do not broaden said sharp resonant optical absorption peak to a value substantially greater than the binding energy of said excitons in said quantum wells, the thickness of said charge carrier semiconductor material layers is chosen to not substantially exceed the diameter of said exciton as it occurs in bulk charge carrier material, and the thickness of said charge barrier material is chosen sufficiently large that the wave functions of said charge carriers do not substantially penetrate from one quantum well into an adjacent quantum well.

22. The four-wave mixer as claimed in claim 1 wherein said charge carrier semiconductor material layers have variations in thickness which do not exceed two atomic diameters of the elements making up said materials.

23. The optical apparatus as claimed in claim 1 further comprising:
at least one diode laser which provides said beams of light, and
a single substrate upon which both said diode laser and said multiple layer heterostructure are made.

24. A four-wave mixer comprising:
a multiple quantum well (MQW) structure as a nonlinear optical material;
means for providing a first beam of light which propagates through said MQW structure; and
means for providing a second beam of light which propagates through said MQW structure and substantially overlaps said first beam of light within said MQW structure so that at least one output phase conjugate beam of light is produced by interaction of said first and said second beams of light with said MQW structure;
said means for providing said first beam of light and said means for providing said second beam of light comprising at least one diode laser.

25. A four-wave mixer comprising:
a multiple quantum well (MQW) structure as a nonlinear optical material;
means for providing a first beam of light which propagates through said MQW structure;
means for providing a second beam of light which propagates through said MQW structure and substantially overlaps said first beam of light within said MQW structure so that at least one output phase conjugate beam of light is produced by interaction of said first and said second beams of light with said MQW structure; and
means for providing a third beam of light propagating substantially parallel to, but in the opposite direction to, said first beam of light and substantially overlapping said first beam of light and said second beam of light within said MQW structure so that at least one output phase conjugate beam of light is produced by interaction of said first, said second, and said third beams of light with said MQW structure;
said means for providing said first, said second, and said third beams of light comprises at least one diode laser.

26. The four-wave mixer as claimed in claims 24 or 25 further comprising:
a single substrate upon which both said at least one diode laser and said multiple quantum well structure are made.

27. The four-wave mixer as claimed in claims 24 or 25 wherein said at least one diode laser has a maximum output beam intensity not exceeding 50 milliwatts.

* * * * *

UNITED STATES PATENT AND TRADEMARK OFFICE
CERTIFICATE OF CORRECTION

PATENT NO. : 4,528,464

DATED : July 9, 1985

INVENTOR(S) : Daniel S. Chemla, David A. B. Miller and Peter W. Smith

It is certified that error appears in the above-identified patent and that said Letters Patent is hereby corrected as shown below:

Column 1, line 29, "$x^{(3)}$" should read --$x^{(3)}$--; line 33, "1.6" should read --1.06--. Column 2, line 17, "02" should read --$O_2$--; Column 7, line 36, "Pat" should read --Part--. Column 9, line 62, "walls" should read --wells--. Column 12, line 25, "$12.10^3 cm^{-1}$" should read --$12 \times 10^3 cm^{-1}$--; line 26, "$8.5.10^3 cm^{-1}$" should read --$8.5 \times 10^3 cm^{-1}$--; line 29, "$11.10^3 cm^{-1}$" should read --$11 \times 10^3 cm^{-1}$--; line 31, "$6.3.10^3 cm^{-1}$" should read --$6.3 \times 10^3 cm^{-1}$--; line 34, "$2.8.10^3 cm^{-1}$" should read --$2.8 \times 10^3 cm^{-1}$--. Column 15, line 2, "$\pi\omega$" should read --$h\omega$--; line 6, "(I(t)" should read --I(t)--. Column 16, line 11, "582" should read --580--; line 12, "586" should read --582--; line 15, "Chopper" should read --Choppers--. Column 18, line 21, "$\pi\omega$" should read --$h\omega$--; line 22, "$\pi\omega$" should read --$h\omega$--. Column 24, line 28, "charger" should read --charge--.

Signed and Sealed this

Eleventh Day of March 1986

[SEAL]

Attest:

DONALD J. QUIGG

Attesting Officer

Commissioner of Patents and Trademarks